(12) United States Patent
Barbour et al.

(10) Patent No.: US 11,587,389 B2
(45) Date of Patent: Feb. 21, 2023

(54) LIFT ASSEMBLY AND MOUNT FOR A MONITOR OF AN ELECTRONIC GAMING MACHINE

(71) Applicant: Aristocrat Technologies, Inc., Las Vegas, NV (US)

(72) Inventors: Timothy Barbour, Nolensville, TN (US); Donald Rodd, Palm Beach Garden, FL (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 17/384,199

(22) Filed: Jul. 23, 2021

(65) Prior Publication Data

US 2022/0092915 A1   Mar. 24, 2022

Related U.S. Application Data

(60) Provisional application No. 63/082,858, filed on Sep. 24, 2020, provisional application No. 63/082,854, (Continued)

(51) Int. Cl.
  *G07F 17/32* (2006.01)
  *G06F 1/16* (2006.01)
  *F16M 11/04* (2006.01)

(52) U.S. Cl.
  CPC ....... *G07F 17/3211* (2013.01); *F16M 11/041* (2013.01); *F16M 11/046* (2013.01);
  (Continued)

(58) Field of Classification Search
  CPC ............ G07F 17/3211; G07F 17/3216; F16M 11/041; F16M 11/046; G06F 1/1601
  See application file for complete search history.

(56) References Cited

U.S. PATENT DOCUMENTS

| D77,825 S | 2/1929 | Fey |
| D139,949 S | 1/1945 | Haggestrom |
| (Continued) | | |

FOREIGN PATENT DOCUMENTS

| AU | 2001051810 A1 | 12/2001 |
| CA | 178255 | 11/2018 |
| (Continued) | | |

OTHER PUBLICATIONS

Flappy Bird arcade cabinet will empty your wallet in record time, Fingas, Jan. 10, 2015, retrieved from https://www.engadget.com/2015/01/10/flappy-bird-arcade-cabinet/.
(Continued)

*Primary Examiner* — Milap Shah
*Assistant Examiner* — Jason Pinheiro
(74) *Attorney, Agent, or Firm* — Armstrong Teasdale LLP

(57) ABSTRACT

An electronic gaming machine includes a cabinet, a monitor configured to display an electronic game, a mount configured to secure the monitor to the cabinet, the mount including a carriage and a linkage assembly pivotably coupled to the carriage and the cabinet, and a lift assembly for moving the mount relative to the cabinet. The lift assembly includes a harness coupled to the carriage and a drive mechanism coupled to the harness and operable to selectively release and retract the harness for moving the monitor relative to the cabinet.

18 Claims, 29 Drawing Sheets

US 11,587,389 B2

Page 2

Related U.S. Application Data filed on Sep. 24, 2020, provisional application No. 63/082,862, filed on Sep. 24, 2020.

(52) U.S. Cl.
CPC ........ *G06F 1/1601* (2013.01); *G07F 17/3216* (2013.01); *F16M 2200/041* (2013.01); *G06F 2200/1614* (2013.01)

(56) References Cited

U.S. PATENT DOCUMENTS

| | | | |
|---|---|---|---|
| D245,359 S | 8/1977 | Wilke | |
| 4,084,194 A * | 4/1978 | Hector | A63F 13/90 463/34 |
| D321,095 S | 10/1991 | Bockwoldt | |
| D344,296 S | 2/1994 | McKay | |
| 5,310,152 A | 5/1994 | O'Neill | |
| D376,391 S | 12/1996 | Okumara | |
| 5,676,231 A | 10/1997 | Legras | |
| D411,582 S | 6/1999 | Muraki | |
| 5,993,317 A | 11/1999 | Majima | |
| D421,631 S | 3/2000 | Tsuda | |
| D460,915 S | 7/2002 | Lynch | |
| 6,464,586 B1 | 10/2002 | Kamata | |
| D467,977 S | 12/2002 | Gatto | |
| 6,530,842 B1 | 3/2003 | Wells | |
| 6,749,515 B2 | 6/2004 | Hedrick | |
| 6,976,919 B2 | 12/2005 | Cole | |
| 7,044,423 B2 | 5/2006 | Bober | |
| D537,482 S | 2/2007 | Gadda | |
| 7,267,613 B2 | 9/2007 | Cole | |
| D562,576 S | 2/2008 | Ritzel | |
| 7,533,762 B2 | 5/2009 | Kuttel | |
| D594,068 S | 6/2009 | Hsu | |
| 7,832,799 B2 | 11/2010 | Davis, Jr. | |
| 8,012,027 B2 | 9/2011 | McGahn | |
| 8,083,458 B2 | 12/2011 | Wilkie | |
| 8,113,517 B2 | 2/2012 | Canterbury | |
| D658,721 S | 5/2012 | Yang | |
| 8,210,949 B2 | 7/2012 | Graf | |
| 8,366,555 B2 | 2/2013 | McGahn | |
| 8,419,550 B2 | 4/2013 | Anthony | |
| 8,444,482 B2 | 5/2013 | Aoki | |
| 8,576,553 B2 | 11/2013 | Myerchin | |
| D704,273 S | 5/2014 | Chudek | |
| D706,741 S | 6/2014 | Myers | |
| 8,740,188 B1 | 6/2014 | Foster | |
| 8,747,225 B2 | 6/2014 | Canterbury | |
| 8,858,343 B2 | 10/2014 | Filipour | |
| 8,894,487 B2 | 11/2014 | Granger | |
| 8,986,109 B2 | 3/2015 | Graf | |
| D740,887 S | 10/2015 | Randazzo | |
| 9,756,941 B1 | 9/2017 | Rowland | |
| D802,676 S | 11/2017 | Steelman | |
| D808,467 S | 1/2018 | Huang | |
| 9,858,750 B2 | 1/2018 | Kovacs | |
| D812,145 S | 3/2018 | Huang | |
| D818,048 S | 5/2018 | Calhoun | |
| D820,915 S | 6/2018 | Lee | |
| D833,535 S | 11/2018 | Lim | |
| D839,357 S | 1/2019 | Steelman | |
| D842,929 S | 3/2019 | Hung | |
| D843,463 S | 3/2019 | Castro | |
| D843,465 S | 3/2019 | Castro | |
| D843,472 S | 3/2019 | Castro | |
| D843,476 S | 3/2019 | Lesley | |
| D843,479 S | 3/2019 | Castro | |
| D844,062 S | 3/2019 | Lesley | |
| D847,905 S | 5/2019 | Lewis | |
| D849,149 S | 5/2019 | Bussey | |
| 10,287,148 B2 | 5/2019 | Urban | |
| D852,890 S | 7/2019 | Ross | |
| D864,305 S | 10/2019 | Ortiz De Viveiros | |
| 10,445,977 B2 | 10/2019 | Tovar | |
| D866,666 S | 11/2019 | Ditton | |
| D867,461 S | 11/2019 | Huang | |
| D868,716 S | 12/2019 | Hodgson | |
| 10,573,118 B2 * | 2/2020 | Goldstein | G07F 17/3211 |
| D887,496 S | 6/2020 | Urban | |
| D889,546 S | 7/2020 | Jones | |
| D889,547 S | 7/2020 | Jones | |
| D890,848 S | 7/2020 | Johnson | |
| 10,716,224 B2 * | 7/2020 | Dunn | H05K 5/0017 |
| D904,098 S | 12/2020 | Le | |
| D905,172 S | 12/2020 | Boese | |
| D907,124 S | 1/2021 | Demarco | |
| D907,708 S | 1/2021 | Demarco | |
| D907,709 S | 1/2021 | Demarco | |
| D908,171 S | 1/2021 | Demarco | |
| D908,173 S | 1/2021 | Demarco | |
| D909,479 S | 2/2021 | Abele | |
| D909,491 S | 2/2021 | Demarco | |
| D910,119 S | 2/2021 | Demarco | |
| D910,763 S | 2/2021 | Demarco | |
| D911,055 S | 2/2021 | Wang | |
| D911,724 S | 3/2021 | Waller et al. | |
| D911,992 S | 3/2021 | Stinson | |
| D913,379 S | 3/2021 | Calhoun | |
| D915,093 S | 4/2021 | Shen | |
| D917,621 S | 4/2021 | Kaminkow | |
| D918,300 S | 5/2021 | Demarco | |
| D918,303 S | 5/2021 | Demarco | |
| D918,850 S | 5/2021 | Shim | |
| D918,852 S | 5/2021 | Shim | |
| D919,010 S | 5/2021 | Bussey | |
| D919,585 S | 5/2021 | Shim | |
| D919,586 S | 5/2021 | Lim | |
| D920,323 S | 5/2021 | Lee | |
| D921,762 S | 6/2021 | Hodgson | |
| 11,151,833 B2 * | 10/2021 | Hemerick | G07F 17/3211 |
| 2002/0198034 A1 | 12/2002 | Wang | |
| 2005/0109892 A1 * | 5/2005 | Bober | F16M 11/046 348/E5.128 |
| 2005/0277477 A1 | 12/2005 | Hajder | |
| 2006/0205504 A1 * | 9/2006 | Okada | G07F 17/32 463/36 |
| 2007/0099708 A1 * | 5/2007 | Okada | A63F 13/90 463/46 |
| 2008/0055491 A1 * | 3/2008 | Gordon | G07F 17/3216 463/20 |
| 2008/0087521 A1 | 4/2008 | Cole | |
| 2008/0113740 A1 | 5/2008 | McGahn | |
| 2008/0113768 A1 | 5/2008 | Baerlocher | |
| 2008/0113820 A1 * | 5/2008 | Tedsen | G07F 17/32 463/46 |
| 2008/0254862 A1 * | 10/2008 | Mattice | G07F 17/3216 463/25 |
| 2008/0254881 A1 | 10/2008 | Lutnick | |
| 2009/0280911 A1 | 11/2009 | Tsao | |
| 2010/0120530 A1 * | 5/2010 | Lesley | G07F 17/3216 463/30 |
| 2013/0035159 A1 * | 2/2013 | Cornell | A63F 13/00 463/31 |
| 2015/0336491 A1 | 11/2015 | Abe | |
| 2017/0039812 A1 | 2/2017 | Baron | |
| 2018/0053373 A1 * | 2/2018 | Goldstein | G07F 17/3213 |
| 2018/0075707 A1 | 3/2018 | Hirai | |
| 2018/0190068 A1 * | 7/2018 | Priddy | G07F 17/3211 |
| 2019/0012874 A1 * | 1/2019 | Goldstein | G07F 17/3218 |
| 2019/0046872 A1 | 2/2019 | Glenn, II | |
| 2019/0096161 A1 | 3/2019 | Barbour | |
| 2019/0096169 A1 | 3/2019 | Tovar | |
| 2019/0096170 A1 * | 3/2019 | Lewis | G07F 17/3211 |
| 2019/0096174 A1 * | 3/2019 | Ambrecht | G07F 17/3213 |
| 2019/0099000 A1 | 4/2019 | Waller | |
| 2019/0254433 A1 | 8/2019 | Smit | |

FOREIGN PATENT DOCUMENTS

| | | |
|---|---|---|
| DE | 0015402120001 | 6/2009 |
| DE | 0015402380001 | 8/2009 |
| DE | 0028613360001 | 11/2015 |
| EP | 1778375 | 5/2007 |

(56) References Cited

FOREIGN PATENT DOCUMENTS

| | | |
|---|---|---|
| JP | 1101243 | 2/2001 |
| JP | 2002263262 A | 9/2002 |
| JP | 1484230 | 10/2013 |
| WO | 2005094957 A1 | 10/2005 |

OTHER PUBLICATIONS

World's Largest Pac-Man Game Overview, Bandai Namco, Jul. 11, 2016, retrieved from https://www.youtube.com/watch?time_continue=54&v=4GqS91TTecGc.

ICE Debuts Shell Game Addition To Price Is Right Redemption Lineup, Montano, Jun. 5, 2011, retrieved from https:/www.vendingtimes.(X)m/articles/ice-debuts-shell-game-addition-to-price-is-right-r-8412?id=5FF3782D18934396BD83A14B3BD1E0BC.

SD Ped pro, Xtension, Sep. 28, 2014, retrieved from http://www.xtensiongaming.com/products/xtension-sit-down-pedestal-arcade-cabineet-for-fight-sticks/attachment/sd-ped-pro/.

Incredible Technologies Details Golden Tee Live 2012, ARCADEHERO, Aug. 25, 2011, retrieved from http://arcadeheroes.com/2011/08/25/incredible-technologies-details-golden-tee-live-2012/.

NOVOMATIC to showcase latest products at Peru Gaming Show, Jun. 2, 2016, retrieved from http://www.innovategaming.com/c63114.

Introductie Fazi Roulette, Elam Group, Jun. 10, 2018, retrieved from https://www.youtube.com/watch?v=RLrFI5QDT5U.

Office Action dated Mar. 25, 2020, for U.S. Appl. No. 29/658,892 (pp. 1-10).

Office Action dated Sep. 18, 2020 for U.S. Appl. No. 29/658,892 (pp. 1-5).

Notice of Allowance dated Dec. 31, 2020 for U.S. Appl. No. 29/658,892 (pp. 1-5).

Notice of Allowance dated Jul. 8, 2021 for U.S. Appl. No. 29/768,121 (pp. 1-10).

Office Action dated Apr. 29, 2021 for U.S. Appl. No. 16/867,290 (pp. 1-12).

Notice of Allowance dated Aug. 5, 2021 for U.S. Appl. No. 16/867,290 (pp. 1-7).

Notice of Allowance dated Nov. 1, 2021 for U.S. Appl. No. 16/867,290 (pp. 1-7).

Office Action dated Jan. 7, 2022 for U.S. Appl. No. 29/696,682 (pp. 1-8).

Office Action dated Apr. 18, 2022 for U.S. Appl. No. 29/696,682 (pp. 1-6).

Office Action dated Aug. 4, 2022 for U.S. Appl. No. 29/708,718 (pp. 1-5).

Office Action dated Aug. 4, 2022 for U.S. Appl. No. 29/716,520 (pp. 1-6).

* cited by examiner

LIFT ASSEMBLY AND MOUNT FOR A MONITOR OF AN ELECTRONIC GAMING MACHINE

CROSS-REFERENCE TO RELATED APPLICATIONS

This application claims the benefit of priority to U.S. Provisional Patent Application No. 63/082,854, filed Sep. 24, 2020, entitled "LIFT ASSEMBLY AND MOUNT FOR A MONITOR OF AN ELECTRONIC GAMING MACHINE," U.S. Provisional Patent Application No. 63/082,858, filed Sep. 24, 2020, entitled "MOUNTING ASSEMBLY FOR AN ELECTRONIC GAMING MACHINE," and U.S. Provisional Patent Application No. 63/082,862, filed Sep. 24, 2020, entitled "ELECTRONIC GAMING MACHINE INCLUDING MONITOR AND PODIUM COUNTERWEIGHT," the entireties of which are incorporated herein by reference.

TECHNICAL FIELD

The field of disclosure relates generally to electronic gaming, and more particularly, to a mount and lift assembly for selectively moving a monitor relative to a cabinet of an electronic gaming machine (EGM).

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

For game play itself, EGMs may include a visual display such as a monitor that is coupled to the cabinet. Over the lifespan of an EGM, the monitor may be removed from the EGM by an operator to allow for servicing or replacement of the monitor on the EGM. However, some conventional EGMs include large monitors having a weight which may make it difficult or prohibitive for an operator to manually lift the monitors off of the EGMs. Moreover, at least some known EGMs include monitors that rest high above a ground surface, thereby compounding the difficulty in manually removing the monitors. Accordingly, an EGM that includes a lifting assembly allowing for a monitor to be moved/and or lowered relative to a cabinet of an EGM is desirable.

BRIEF DESCRIPTION

In one aspect, an electronic gaming machine is provided. The electronic gaming machine includes a cabinet, a monitor configured to display an electronic game, a mount configured to secure the monitor to the cabinet, the mount including a carriage and a linkage assembly pivotably coupled to the carriage and the cabinet, and a lift assembly for moving the mount relative to the cabinet. The lift assembly includes a harness coupled to the carriage and a drive mechanism coupled to the harness and operable to selectively release and retract the harness for moving the monitor relative to the cabinet.

In another aspect, a mounting assembly for removably coupling a monitor to a cabinet of an electronic gaming machine is provided. The mounting assembly includes a mount configured to secure the monitor to the cabinet, the mount including a carriage and a link pivotably coupled to the carriage and the cabinet. The mounting assembly further includes a lift assembly including a harness coupled to the carriage and a drive mechanism coupled to the harness, the drive mechanism being operable to selectively release and retract the harness to rotate the link about the pivotable coupling with the cabinet and move the mount relative to the cabinet.

In yet another aspect, an electronic gaming machine is provided. The electronic gaming machine includes a pedestal, a monitor configured to display an electronic game, and a mounting assembly for removably coupling the monitor to the pedestal. The mounting assembly includes a mount configured to secure the monitor to the pedestal. The mount including a carriage and a linkage assembly pivotably coupled to the carriage and the pedestal. The mounting assembly further includes a harness coupled to the carriage and a drive mechanism coupled to the harness and operable to selectively release and retract the harness for moving the monitor relative to the pedestal.

DETAILED DESCRIPTION

The electronic gaming machine described herein may include a cabinet, a monitor configured to display a wagering game and a mount configured to secure the monitor to the cabinet. The mount may include a frame and a link rotatably coupled to the frame and the cabinet. The electronic gaming machine may also include a lift assembly that is operable to pivot the mount and includes a carriage, a harness, and a drive mechanism. The carriage may be slidably received within the frame of the mount and coupled to the monitor. The harness may be coupled to the carriage and the drive mechanism. The drive mechanism may be operable to selectively release and retract the harness to move the monitor relative to the cabinet. Accordingly, embodiments of the electronic gaming machine described herein may facilitate installing and/or servicing of the monitor, without requiring an operator and/or operators to manually lift the full weight of the monitor from the cabinet.

Figure 1:
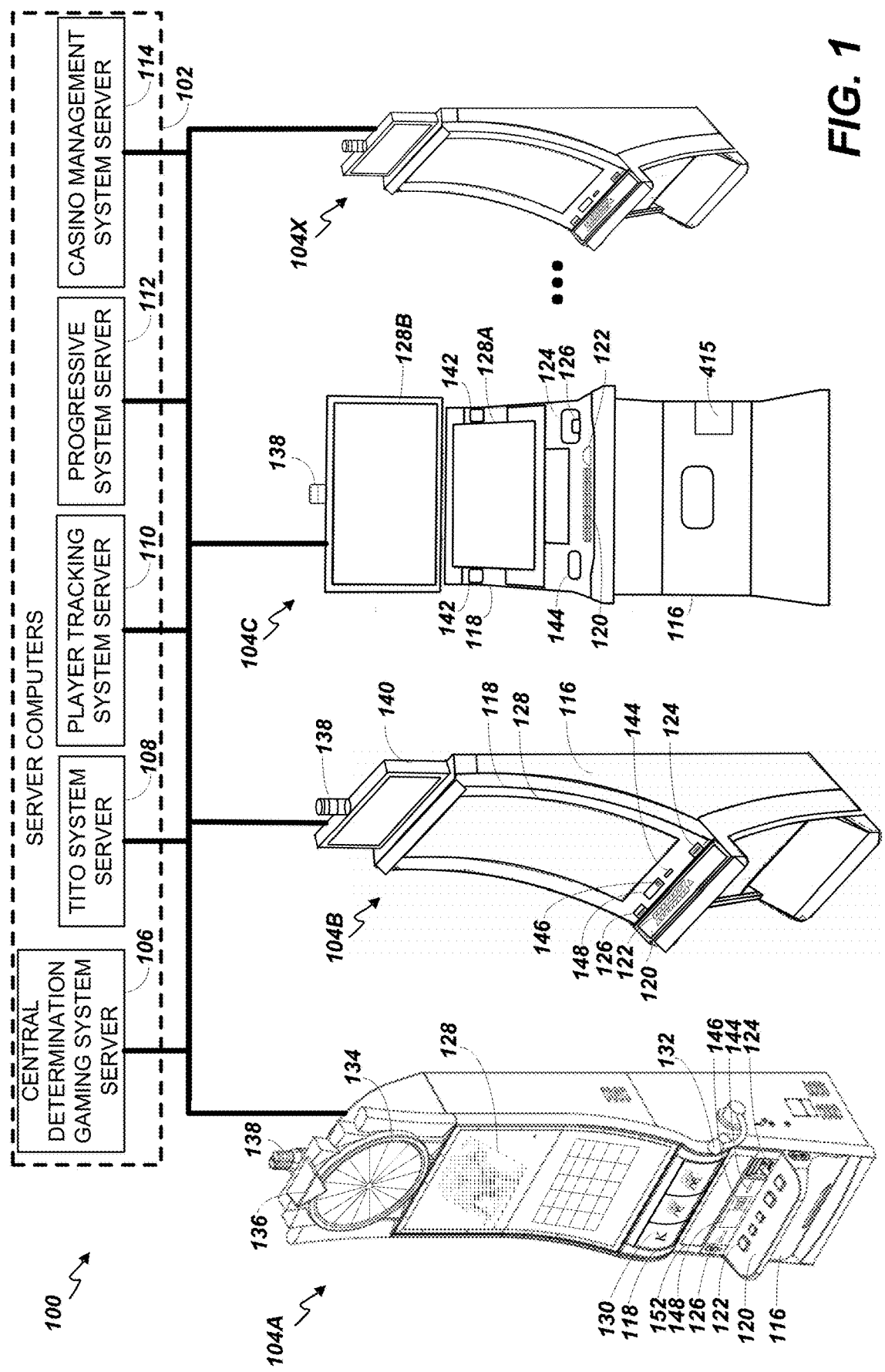
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
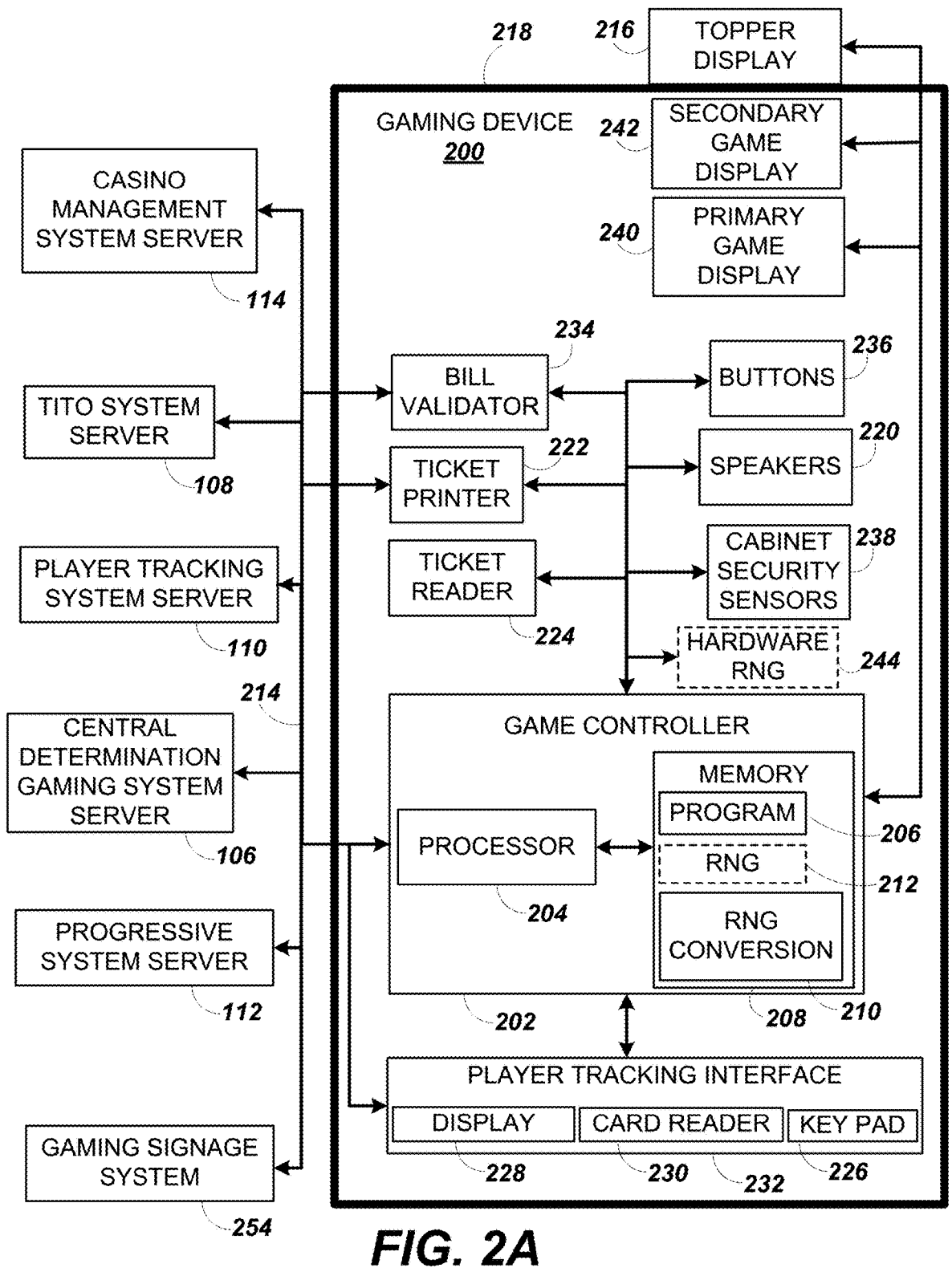
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
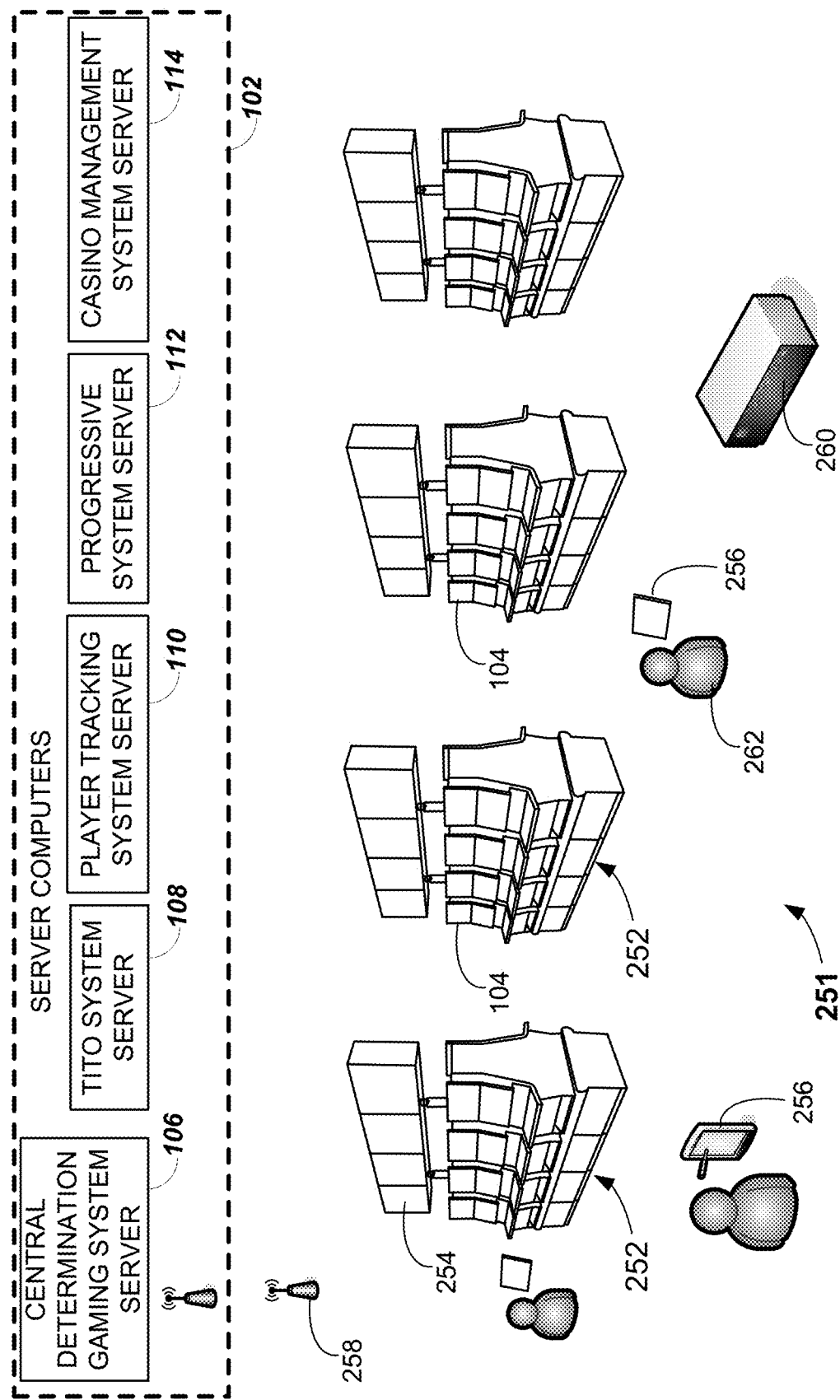
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
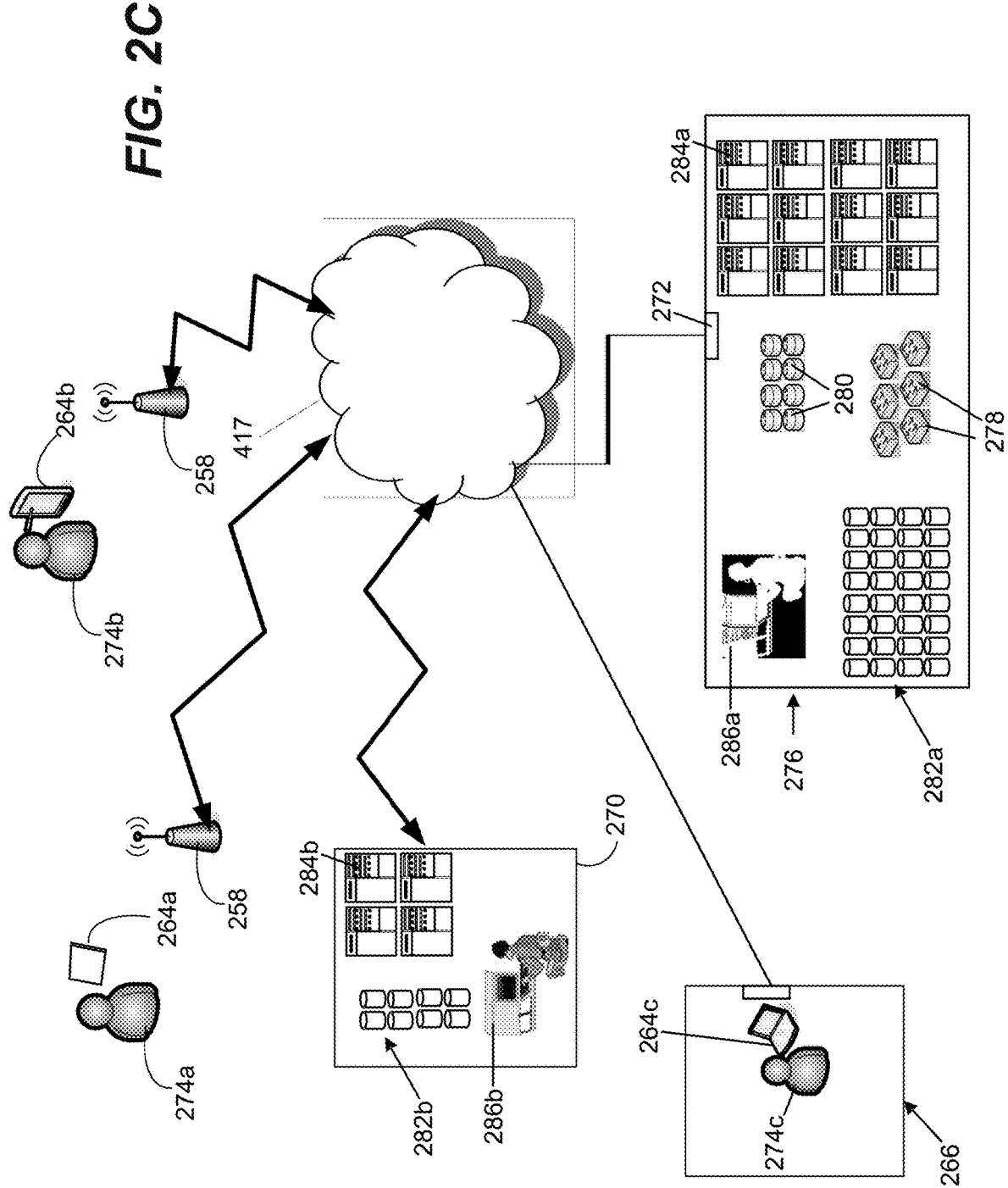
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
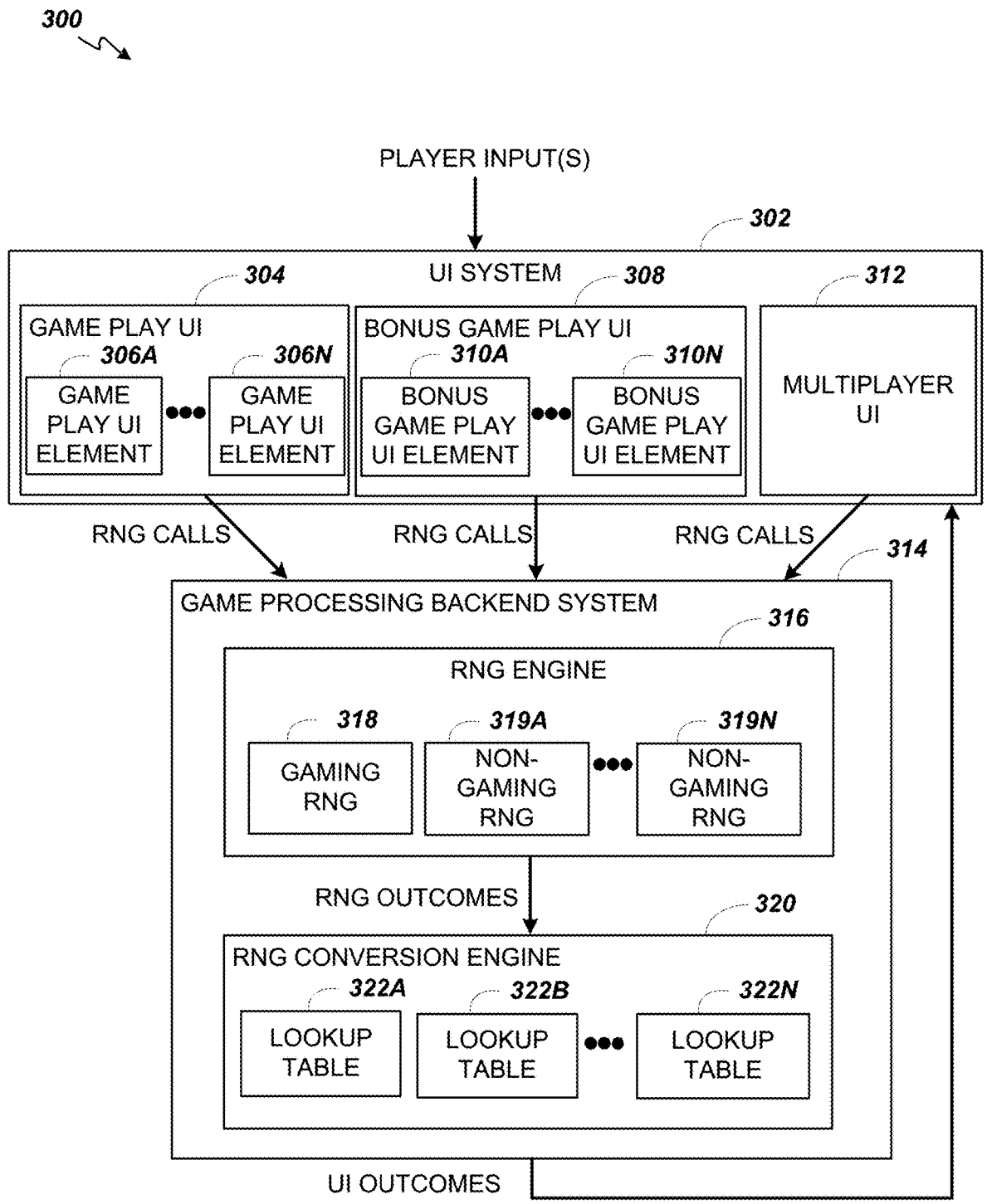
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
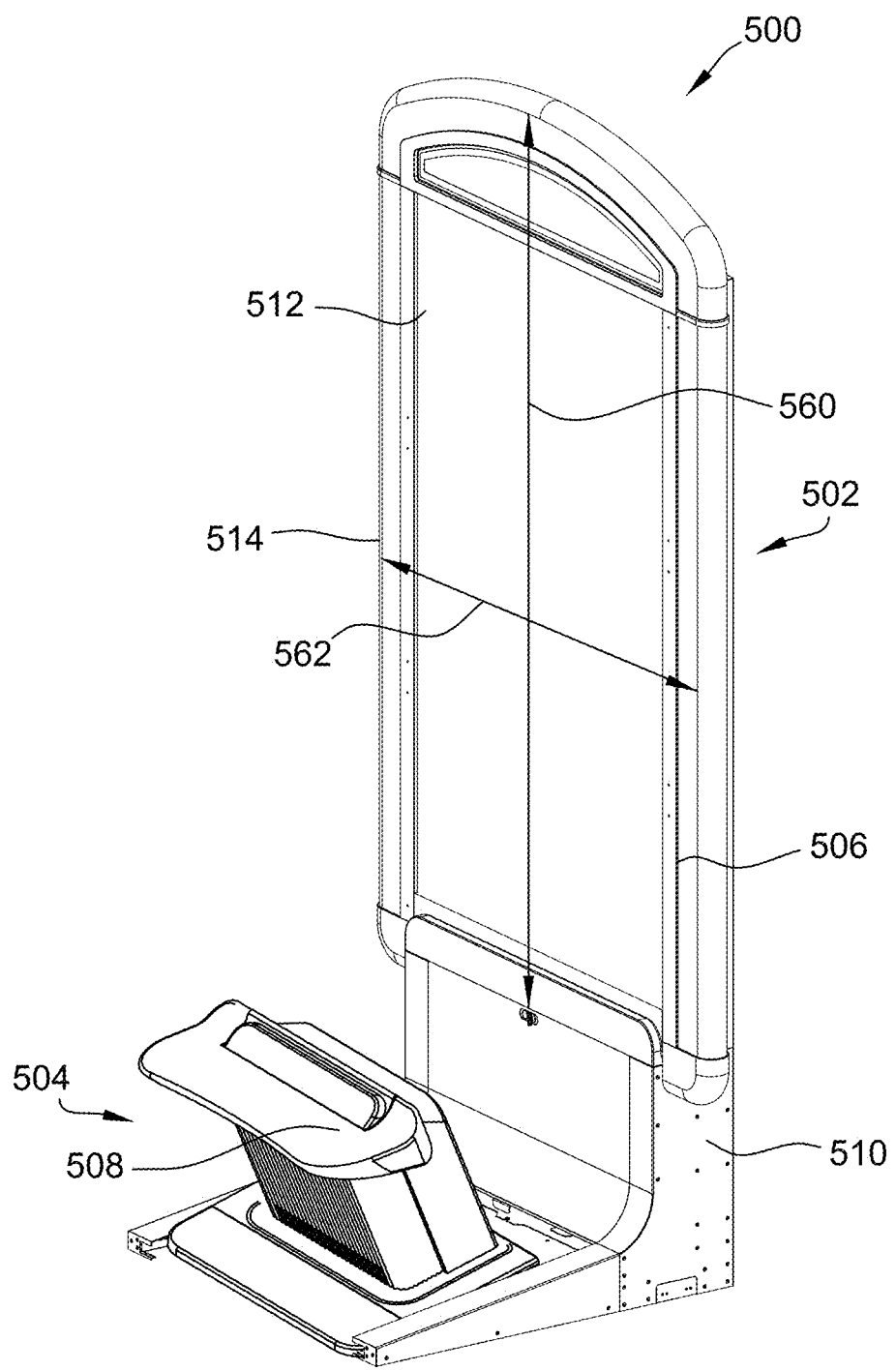
FIG. 4 is a perspective view of an exemplary electronic gaming machine as shown in FIG. 1, including a pedestal and a podium.
Figure 5:
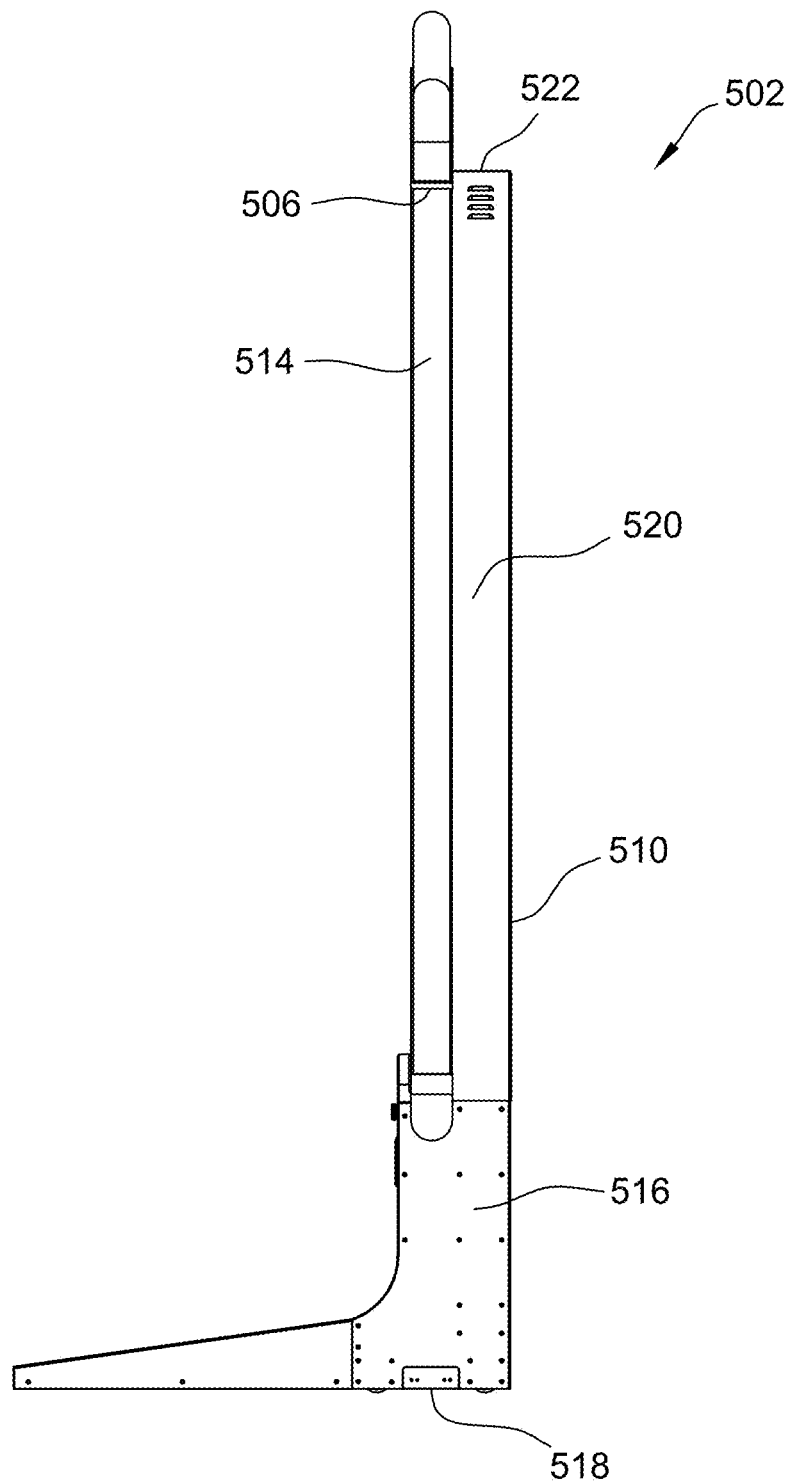
FIG. 5 is a side view of the pedestal shown in FIG. 4, including a monitor in a closed position.

FIG. 4 is a perspective view of an exemplary electronic gaming machine 500, such as gaming devices 104 and 200 (shown in FIGS. 1 and 2A), including a pedestal 502 and a podium 504. FIG. 5 is a side view of pedestal 502 including a monitor 506 in a closed position. In the example embodiment, podium 504 is configured to receive player inputs and control a wagering game that may be displayed at pedestal 502. More specifically, in the example embodiment, podium 504 includes a button deck 508 which may be used by a player to control and/or play an electronic game. In some embodiments, button deck 508 may be similar to button deck 120 (shown in FIG. 1) and may include buttons 122, 236 (e.g., in a button panel), a touchscreen, and/or virtual buttons. In the example embodiment, podium 504 acts as a secure enclosure for various gaming device components (not shown). For example, and without limitation, in the example embodiment, a game controller of gaming machine 500, such as game controller 202 (shown in FIG. 2A), is housed within podium 504. In alternative embodiments, the game controller is housed within pedestal 502.

In the example embodiment, pedestal 502 includes a cabinet 510 and monitor 506 removably coupled to cabinet 510. Monitor 506 includes a display device 512 positioned within a display frame 514. Display device 512 is configured to display an electronic game (e.g., during game play). In some embodiments, display device 512 is similar main display 128 (shown in FIG. 1). Display device 512 is laterally spaced from podium 504 and is coupled in communication with the game controller (not shown) positioned within podium 504. During use, a player may be seated at podium 504 and face display device 512 to view a wagering game. The player may further control aspects of the wagering game by providing inputs (e.g., a wager, gameplay selections, etc.) at button deck 508.

Referring to FIG. 5, in the example embodiment, cabinet 510 includes a base 516 defining a lower end 518 of cabinet 510 and a lift housing 520 coupled to base 516 and defining an opposed upper end 522 of cabinet 510. Cabinet 510 extends longitudinally between upper end 522 and lower end 518. In alternative embodiments, lift housing 520 is integrally formed with base 516. When in the closed position (alternatively a "display position" or an "active position") of FIG. 5, monitor 506 abuts lift housing 520 and display frame 514 is positioned to be flush with lift housing 520. In particular, when in the closed position, monitor 506 is configured to display wagering game to a player seated at podium 504 (shown in FIG. 4). In the example embodiment, monitor 506 is configured to be selectively removed from cabinet 510. For example, and without limitation, during operation, a repair and/or routine servicing of monitor 506 may be performed by separating monitor 506 from cabinet 510. Additionally, or alternatively, monitor 506 may be removed from cabinet 510 to enable replacing monitor 506 with a new monitor 506 having a different display device 512 (shown in FIG. 4). In the example embodiment, monitor 506 is moveable relative to cabinet 510 from the closed position to allow monitor 506 to be more easily lifted (e.g., by an operator) and removed from cabinet 510.

Figure 6:
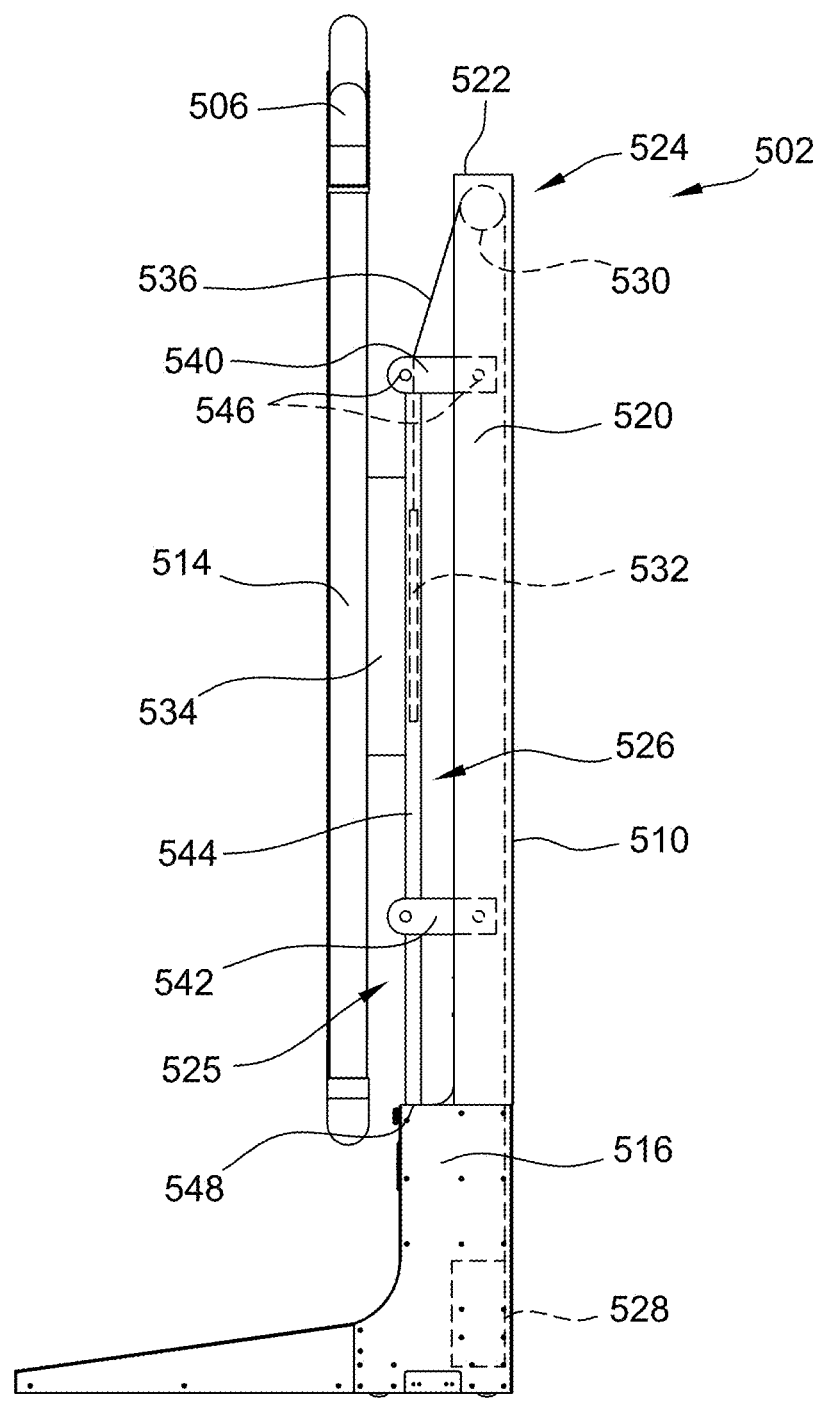
FIG. 6 is a side view of the pedestal shown in FIG. 4 showing the monitor in an extended position.
Figure 7:
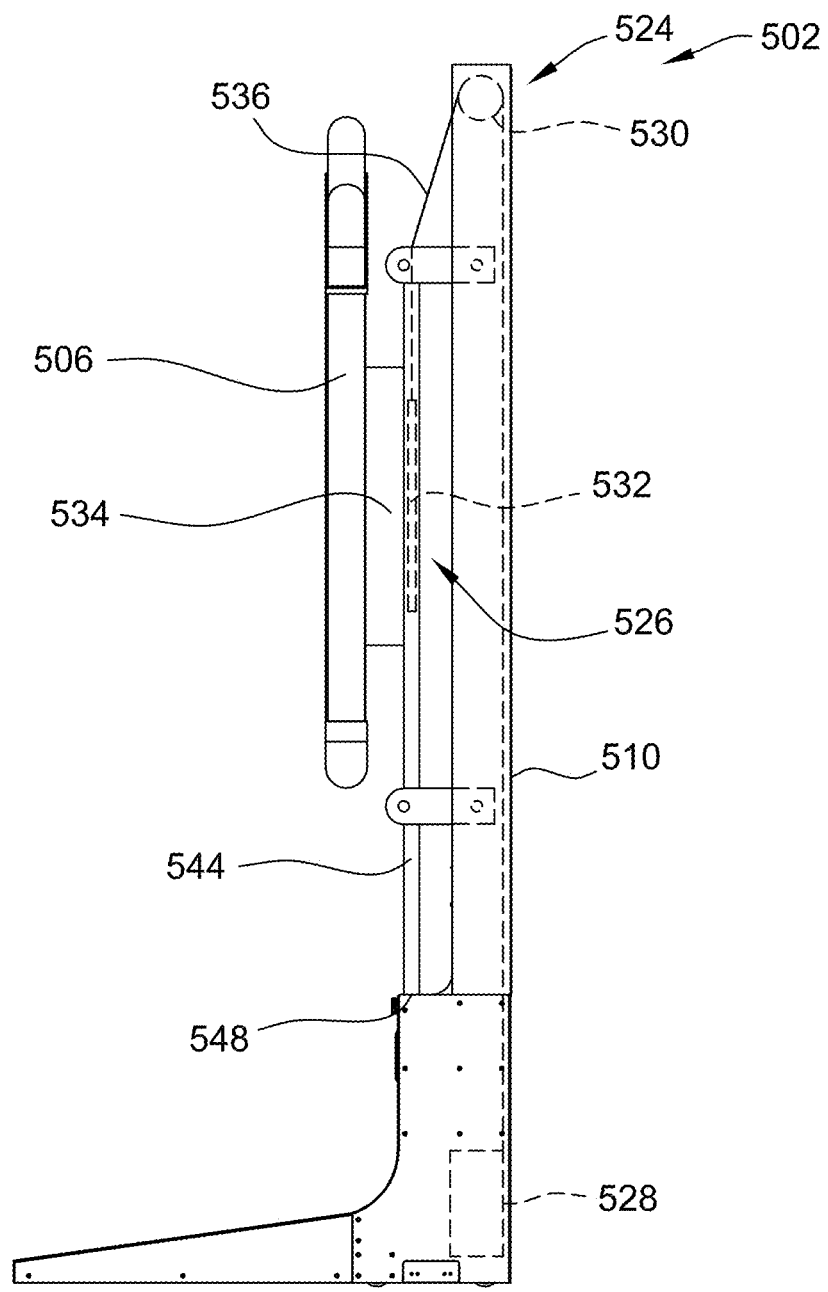
FIG. 7 is a side view of the pedestal shown in FIG. 6 with the monitor rotated in a landscape orientation.
Figure 8:
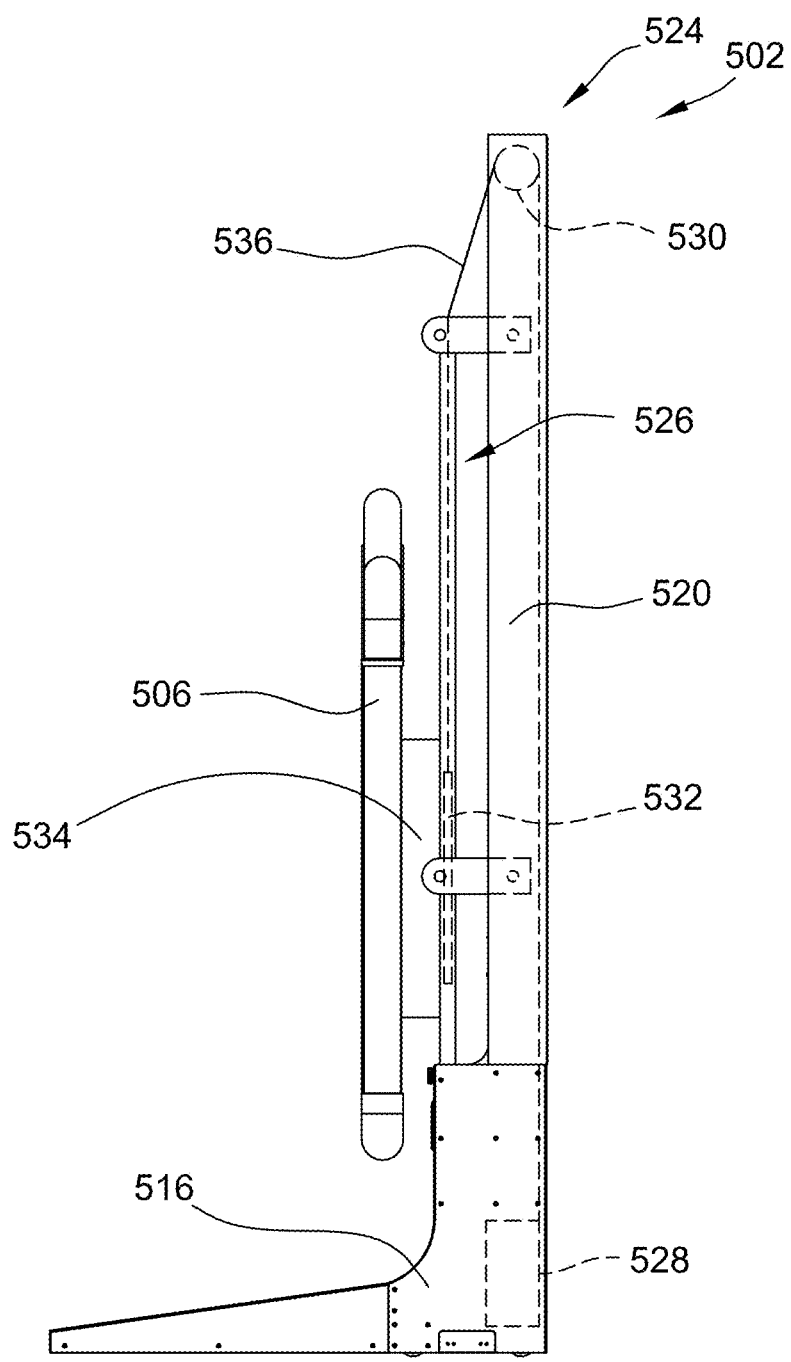
FIG. 8 is a side view of the pedestal shown in FIG. 7 with the monitor in a lowered position.

FIG. 6 is a side view of pedestal 502 showing monitor 506 in an extended position, in which monitor 506 is laterally spaced from lift housing 520. FIG. 7 is a side view of pedestal 502 with monitor 506 rotated in a landscape orientation. FIG. 8 is a side view of pedestal 502 with monitor 506 in a lowered position. In the example embodiment, pedestal 502 includes a lift assembly, indicated generally at 524, and a display mount, indicated generally at 526. Display mount 526 and lift assembly 524 are operable to selectively move monitor 506 between the closed position (shown in FIG. 5) and the extended position.

In the example embodiment, lift assembly 524 includes a drive mechanism 528 (shown schematically in FIG. 6), a pulley 530, and a carriage 532. Monitor 506 includes a rotatable plate 534 attached to display frame 514 and removably coupled to carriage 532. A wire harness 536 extends from drive mechanism 528, around pulley 530, and is securely engaged to carriage 532 to support monitor 506. In the example embodiment, carriage 532 is slidably coupled to display mount 526 to facilitate raising or lowering monitor 506 on display mount 526 by releasing or retracting wire harness 536.

In the example embodiment, drive mechanism 528 is coupled to cabinet 510 and is operable to selectively release and retract wire harness 536 to facilitate selectively moving monitor 506 relative to cabinet 510. In the example embodiment, drive mechanism 528 includes a winch (not shown) and wire harness 536 is coiled around winch. Drive mechanism 528 may be configured to be electrically powered (e.g., via a motor and/or user operated electric tool such as a drill) to selectively release wire harness 536. Drive mechanism 528 may be activated to rotate the winch in a first direction which selectively releases wire harness 536 by uncoiling wire harness 536 on the winch. Drive mechanism 528 may also be activated to rotate the winch in a second, opposite direction, which selectively retracts wire harness 536 by coiling wire harness 536 on the winch. In some embodiments, drive mechanism 528 includes one or more locking elements (not shown) which allow for the winch to be locked (i.e., such that rotation of the winch is prevented) automatically until the operator activates a release, thereby unlocking the winch. In alternative embodiments, drive mechanism 528 is any mechanism that enables lift assembly 524 to function as described herein. For example, and without limitations, in some alternative embodiments, drive mechanism 528 includes a counterweight spring mechanism (e.g., as shown with respect to FIG. 14). In the example embodiment, drive mechanism 528 is positioned within base 516 and secured thereto. In alternative embodiments, drive mechanism 528 is coupled to cabinet 510 in any manner that enables lift assembly 524 to function as described herein. For example, and without limitation, in some alternative embodiments, lift assembly 524 does not include pulley 530 and drive mechanism is coupled to cabinet 510 proximate upper end 522 of cabinet 510.

In the example embodiment, display mount 526 is secured to cabinet 510. More specifically, display mount 526 includes an upper link 540 and a lower link 542 which are each rotatably coupled to cabinet 510. Links 540, 542 are also each rotatably coupled to a track frame 544 which extends between links 540, 542. In alternative embodiments, display mount 526 may include any number of links 540, 542 that enable display mount 526 to function as described herein. For example, and without limitation, in some alternative embodiments, display mount 526 further includes a second upper link and a second lower link (not shown), similar to second upper link 641 and second lower link 643 (shown in FIG. 9) to distribute a load exerted on display mount 526 by monitor 506. In further alternative embodiments, display mount 526 includes a single link (not shown) extending between track frame 544 and cabinet 510.

In the example embodiment, upper link 540 and lower link 542 are each secured to track frame 544 and cabinet 510 through rotatable couplings 546. As used herein, a rotatable coupling is defined as a connection that secures two points of adjacent components together preventing translation but allowing rotation. A hinge is an example of a rotatable coupling that allows rotation in a single direction. A ball and socket is an example of a rotatable coupling that allows rotation in a three directions. In the example embodiments, the links 540, 542 are secured to cabinet 510 and track frame 544 by a shaft of a bolt passing through eyeholes in the links 540, 542 allowing the links 540, 542 to rotate about the axis of the shaft. In alternative embodiments, links 540, 542 includes any rotatable coupling 546 that enables linkage assembly 538 to function as described herein.

Figure 9:
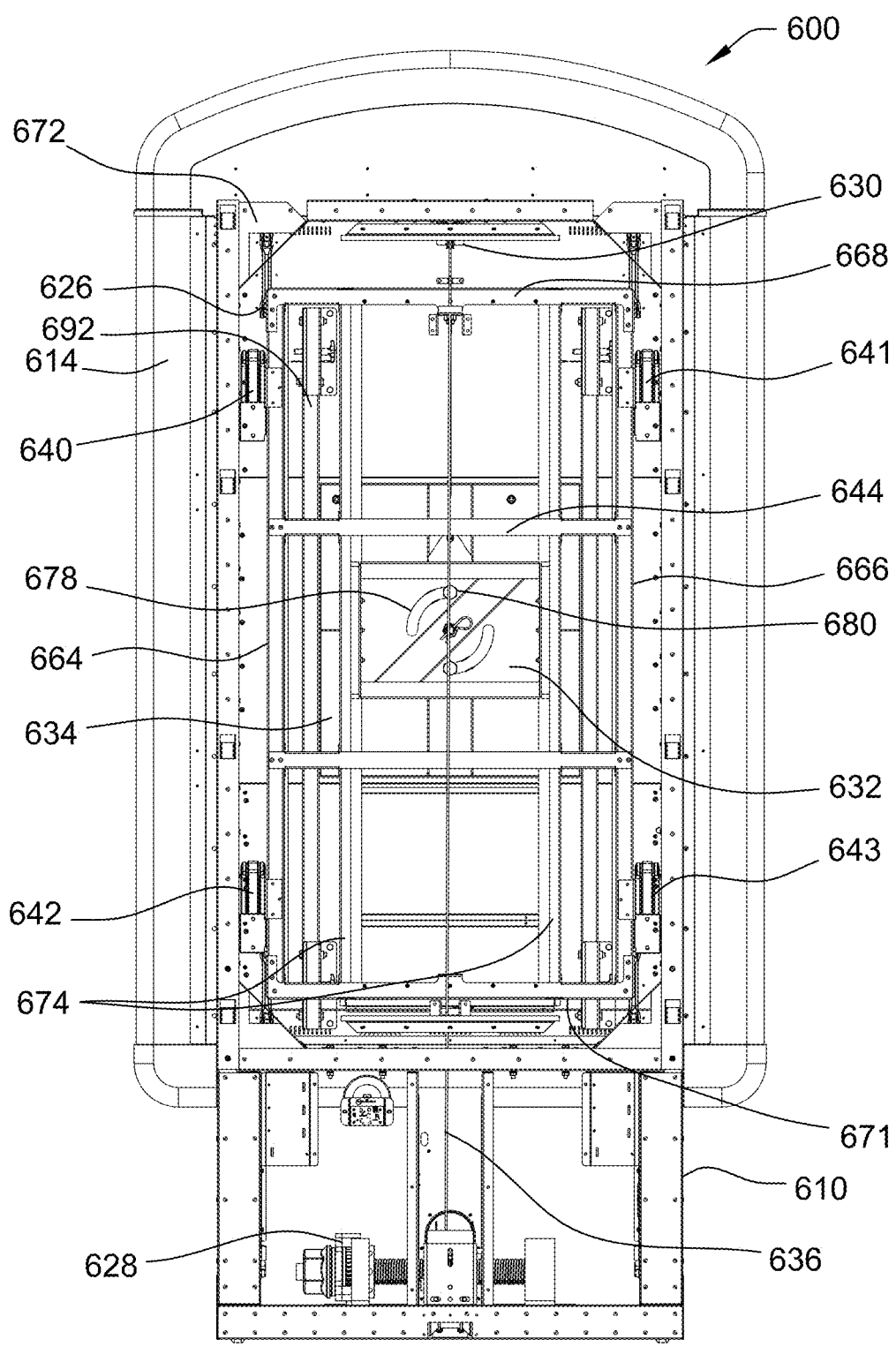
FIG. 9 is a rear view of an alternative electronic gaming machine.

In the example embodiment, upper link 540 and lower link 542 are configured to rotate approximately 90 degrees relative to cabinet 510 between a first position, similar to the first position shown in FIG. 9, in which the links 540, 542 are oriented longitudinally within cabinet 510, to a second position, as shown in FIG. 6, in which links 540, 542 are oriented to extend laterally from lift housing 520. Moreover, in the example embodiment, rotation of links 540, 542 to the second position moves track frame 544 laterally outward and longitudinally downward from lift housing 520, while generally maintaining the longitudinal orientation of track frame 544. In the example embodiment, pedestal 502 includes a stop 548 that inhibits rotation of links 540, 542 beyond the second position. More specifically, in the example embodiment, stop 548 is an upper surface of base 516 which engages and supports track frame 544 when links 540, 542 are in the second position, thereby inhibiting further rotation of links 540, 542 beyond the second position. In alternative embodiments, pedestal 502 includes any stop 548 that enables display mount 526 to function as described herein. For example, and without limitation, in some alternative embodiments, a plate (not shown) is coupled to lift housing 520 proximate links 540, 542 which engages links 540, 542 when links 540, 542 are in the second position, thereby inhibiting rotation of links 540, 542 beyond the second position.

In the example embodiment, links 540, 542 are rotated to the second position by selectively releasing wire harness 536 via drive mechanism 528. More specifically, when monitor 506 is in the closed position (shown in FIG. 5), wire harness 536 is under tension and carriage 532 is engaged with track frame 544 such that carriage 532 is inhibited from being longitudinally raised further on track frame 544. Accordingly, in the closed position, wire harness 536 lifts carriage 532, which pulls track frame 544 toward pulley 530, thereby orienting links 540, 542 longitudinally within lift housing 520. When drive mechanism 528 is controlled to selectively release wire harness 536, links 540, 542 gradually rotate with release of wire harness 536 to the second position, as shown in FIG. 6, thereby moving monitor 506 laterally away from cabinet 510 until track frame 544 engages stop 548.

As shown in FIG. 4, in the example embodiment, when monitor 506 is in the closed position, monitor 506 generally has a portrait orientation. That is, monitor 506 has a length 560 that is greater than the width 562 of the monitor 506. In the example embodiment, monitor 506 is rotatably coupled to carriage 532 via rotatable plate 534 to enable rotation of monitor from the portrait orientation to a landscape orientation (as shown in FIG. 7) when monitor 506 is in the extended position. Moreover, in the example embodiment, stop 548 inhibits rotation of monitor 506 relative to lift housing 520 when monitor 506 is in the closed position. In alternative embodiments, pedestal 502 may additionally or alternatively include a latch (not shown) that engages monitor 506 when monitor 506 is in the closed position. In some such embodiments, the latch may inhibit rotation of monitor 506 such that the latch must be released before monitor 506 is permitted to rotate relative to carriage 532.

In the example embodiment, carriage 532 is slidable longitudinally along track frame 544 to facilitate lowering monitor 506 on track frame 544 once monitor 506 is the extended position and laterally spaced from lift housing 520. More specifically, in the example embodiment, when display mount 526 engages stop 548, additional release of wire harness 536 from drive mechanism 528 lowers carriage 532 on track frame 544, thereby lowering monitor 506 relative to cabinet 510. Carriage 532 may be received within tracks (not shown), similar to tracks 676 (shown in FIG. 10) to enable sliding movement of carriage 532 relative to track frame 544. Additionally or alternatively, in some embodiments at least one roller (not shown) may be positioned between carriage 532 and track frame 544 to reduce friction interference between carriage 532 and track frame 544.

In the example embodiment, to remove monitor 506 from cabinet with monitor 506 in the closed position, an operator may first access drive mechanism 528 to control selective release of wire harness 536. Operator may further first release one or more safety mechanisms (not shown) which inhibit release of wire harness 536. When in the closed position (shown in FIG. 5), selective release of wire harness 536 causes links 540, 542 to pivot to the second position where track frame 544 engages stop 548. Once track frame 544 is engaged with stop 548, monitor 506 may be rotated 90 degrees about carriage 532 to a landscape orientation, as shown in FIG. 7. For example, the operator controlling drive mechanism 528 may hold drive mechanism 528 and manually rotate monitor 506 to the landscape orientation. Alternatively, an additional operator may rotate monitor 506 once release of wire harness 536 by drive mechanism 528 is paused.

With monitor 506 in the landscape orientation, drive mechanism 528 is activated to lower monitor 506 until monitor 506 is in the lowered position, as shown in FIG. 8. For example, in some embodiments, track frame 544 includes a carriage stop (not shown) which prevents lowering of carriage 532 beyond a predetermined point on track frame 544. Additionally or alternatively, at least one of drive mechanism 528 and wire harness 536 may include a stop (not shown) which prevents lowering of carriage 532 beyond the predetermined point. For example and without limitation, in some embodiments, wire harness 536 includes a block (not shown) fixed to wire harness 536 at a predetermined point such that, when monitor 506 is in the lowered position, the block engages a component of cabinet 510 and/or lift assembly 524 (e.g., such as pulley 530), thereby preventing further release of wire harness 536. In further alternative embodiments, wire harness 536 extends a length such that wire harness 536 is fully uncoiled from drive mechanism 528, when monitor 506 is in the lowered position.

In the example embodiment, rotating monitor 506 to the landscape orientation allows for a center of mass of monitor 506 to be lowered to a lower point relative to cabinet 510 than can be achieved in the portrait orientation. In particular, by rotating monitor 506, monitor 506 may be lowered further on track frame 544 in the landscape orientation, as compared to the portrait orientation, before base 516 obstructs further lowering of monitor 506. In alternative embodiments, monitor 506 is not rotatable relative to track frame 544 and monitor 506 is lowered relative to cabinet 510 without rotating monitor 506. For example, in some such embodiments, monitor 506 may be moved to the extended position and lowered to the lowered position as a single continuous movement without holding release of wire harness 536 to rotate monitor 506.

In the example embodiment, with monitor 506 in the lowered position, monitor 506 may be decoupled from cabinet 510 by disconnecting rotatable plate 534 from carriage 532 and lifting monitor 506 off carriage 532. For example, one operator may hold the monitor 506 at each end and lift monitor 506 from carriage 532. Moreover, a new monitor (not shown) or monitor 506 may be coupled to carriage 532 and moved to the closed position in substantially the reverse order of the steps described above.

Figure 10:
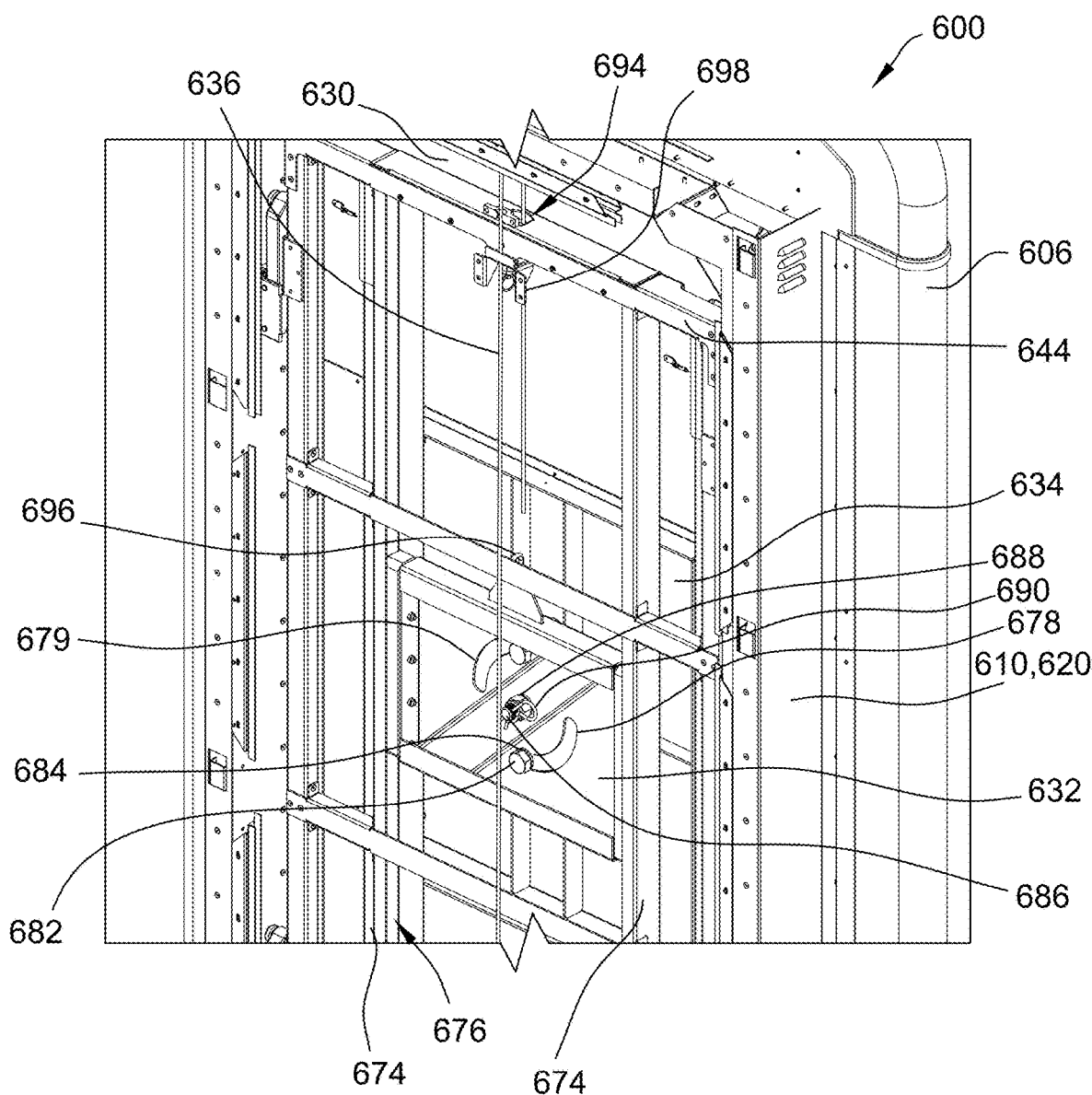
FIG. 10 is a perspective view of a portion of the electronic gaming machine shown in FIG. 9.

FIG. 9 is a rear view of an alternative electronic gaming machine 600 with certain portions removed for clarity. FIG. 10 is a perspective view of a portion of electronic gaming machine 600. Electronic gaming machine 600 is substantially the same as electronic gaming machine 500 (shown in FIGS. 4-8), except as described below.

In the example embodiment, display mount 626 includes a first upper link 640, a second upper link 641, a first lower link 642, and a second lower link 643. In the example embodiment, links 640, 641, 642, 643 are substantially identical. Track frame 644 extends laterally from a first side 664 to a second, opposed side, 666 and longitudinally from an upper end 668 to an opposed lower end 671. Cabinet 610 includes a mounting frame 672 surrounding track frame 644 when monitor is in the closed position. In the example embodiment, first upper link 640 and first lower link 642 are each rotatably coupled to mounting frame 672 and first side 664 of track frame 644. Second upper link 640 and second lower link 643 are each rotatably coupled to mounting frame 672 and second side 666 of track frame 644. Pulley 630 is coupled to mounting frame 672 above upper end 668 of track frame 644.

In the example embodiment, track frame 644 includes a pair of opposed longitudinally extending track bars 674, each defining a respective track 676 (shown in FIG. 10) therein. Carriage 632 is slidably received in the tracks 676 of track bars 674 to facilitate longitudinal movement of carriage 632 relative to track bars 674. Carriage 632 defines a pair of circumferentially opposed slots 678 extending through carriage 632. Rotatable plate 634 includes a pair of pin assemblies 680 that extend through the slots 678. More specifically, in the example embodiment, pin assemblies 680 are positioned circumferentially opposite one another within slots 678. In the example embodiment, pin assemblies 680 each include a pin (not shown) and a closure member 682 coupled to respective pins. The closure members 682 each define a circumferential outer edge 684 (shown in FIG. 10) that is larger than the slots 678 to inhibit movement of pins out of slots 678. More specifically, in the example embodiment, the closure members 682 are bolts that are removably coupled to the pins and define the outer edges 684. The configuration of pin assemblies 680 and slots 678 allow for rotation of monitor 606 between the portrait orientation and landscape orientation (e.g., as shown in FIGS. 7 and 8). More specifically, pin assemblies 680 are slidably received within slots 678 such that, when monitor 606 is in the extended position applying a torque to monitor 606 (e.g., in the counter clockwise direction in the view shown in FIG. 9) moves pin assemblies 680 within slots 678 to enable monitor 606 to rotate to the landscape orientation.

In the example embodiment, monitor 606 further includes a pair of opposed longitudinally extending rails 692 coupled to display frame 614 and rotatable plate 634. In particular, in the example embodiment, rails 692 are fixed to display frame 614 and rotatable plate 634 to inhibit bending of display frame 614 on cabinet 610. As described in greater detail with respect to FIG. 14, in the example embodiment, drive mechanism 628 is a counterweight drive system configured to selectively release wire harness 636. In particular, wire harness 636 is coiled around a shaft (not shown) of drive mechanism 628 and extends around pulley 630.

Referring to FIG. 10, in the example embodiment, a mounting pin 686 is coupled to rotatable plate 634 and extends through a central slot (not shown) defined within carriage 632 to provide additional structural reinforcement securing rotatable plate 634 to carriage 632. A bolt 688 is threadably secured to mounting pin 686 and a locking pin 690 extends through mounting pin 686 to inhibit release of bolt 688 and/or outward movement (i.e., into the page in FIG. 9) of rotatable plate 634 relative to carriage 632. During operation, when monitor 606 is extended and in the lowered position (e.g., as shown in FIG. 8) monitor 606 may be removed from carriage 632 by removing closure members 682, releasing locking pin 690, removing bolt 688 from mounting pin 686. Monitor 606 may then be pulled laterally outward from carriage 632. In alternative embodiments, monitor 606 is secured to carriage 632 in any manner that enables electronic gaming machine 600 to function as described herein.

In the example embodiment, track frame 644 defines an aperture 694 extending therethrough. More specifically, in the example embodiment, aperture 694 is defined in track frame 644 such that aperture 694 is substantially in longitudinal alignment with pulley 630 when monitor 606 is in the closed position. Wire harness 636 extends around pulley 630, through aperture 694 to a shackle 696 securely coupled to carriage 632. In the example embodiment, as monitor 606 is moved to the extended position (shown in FIG. 6), wire harness 636 pivots from extending longitudinally between pulley 630 and aperture 694 to extending obliquely between pulley 630 and aperture 694. Wire harness 636 extends generally longitudinally between aperture 694 and carriage 632 when monitor 606 is in the closed position and when monitor 606 is in the extended position. In some embodiments, a wire guide (not shown) is positioned within aperture 694 to reduce and/or inhibit frictional contact between wire harness 636 and track frame 644. For example, in some such embodiments, mounting frame 672 includes a roller element (not shown) positioned within aperture 694.

Figure 11:
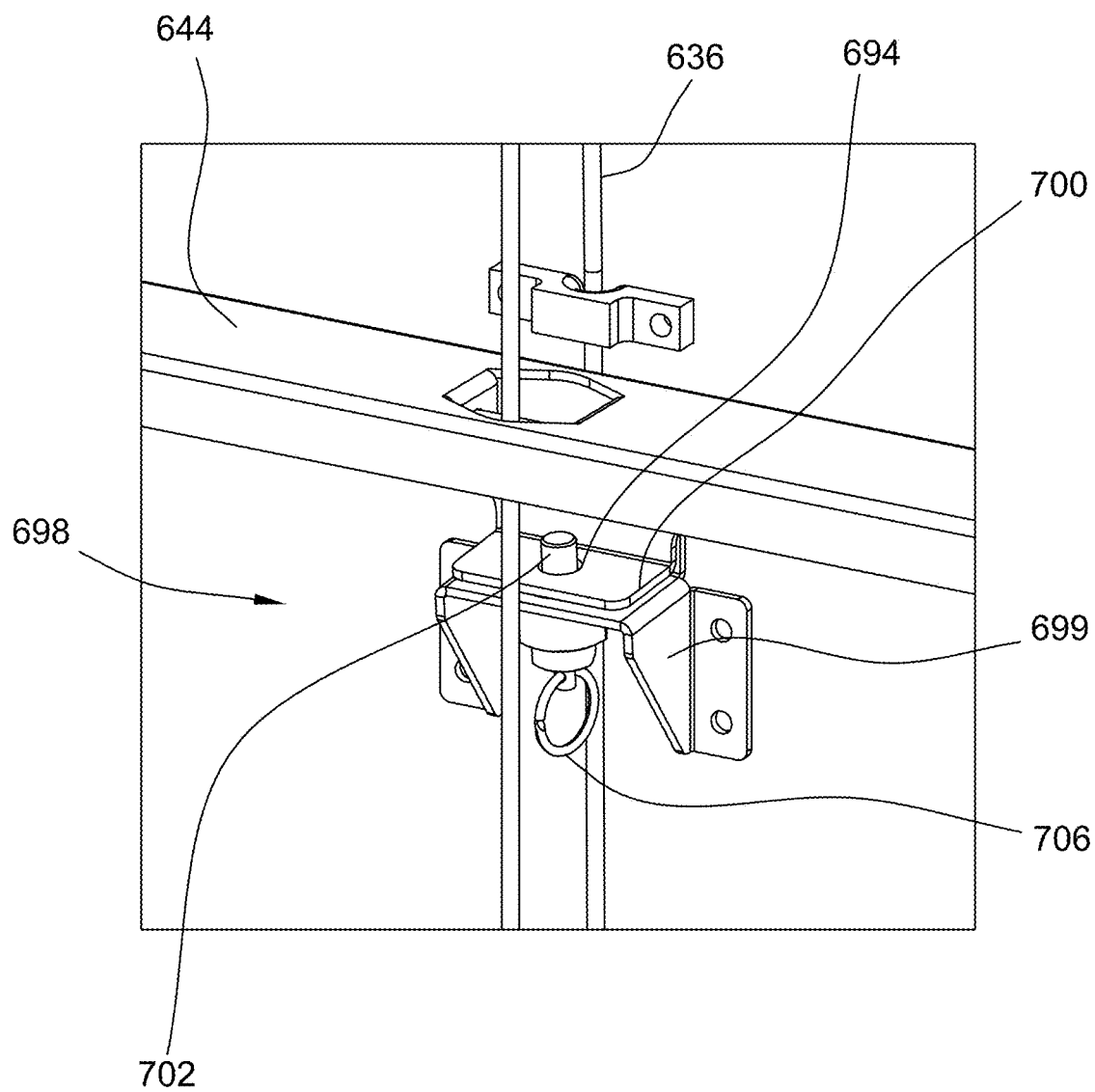
FIG. 11 is an enlarged perspective view of a safety release mechanism for use with the electronic gaming machine shown in FIG. 9.

In the example embodiment, a safety release mechanism 698 releasably couples track frame 644 to cabinet 610. In particular, safety release mechanism 698 is configured to prevent track frame 644 from pivoting from the closed position to the open position even after wire harness 636 is selectively released. FIG. 11 is an enlarged perspective view of safety release mechanism 698. In the example embodiment, safety release mechanism 698 includes a bracket 699 configured to be fixed to a rear surface (not shown) of cabinet 610 (shown in FIG. 10) or, more specifically, lift housing 620 of cabinet 610. A leg 700 is fixedly coupled to track frame 644 and depends therefrom. A spring biased pin 702 extends through aligned apertures 704 defined in bracket 699 and leg 700. A ring 706 is coupled to spring biased pin 702 and is configured to be engaged by a safety harness (not shown). For example in some embodiments, a safety harness (not shown), similar to wire harness 636 may be attached to ring 706 and extends to cabinet 610. In alternative embodiments, ring 706 may be accessible by an operator via one or more access doors (not shown) in cabinet 610. In the example embodiment, spring biased pin 702 biases pin to an engaging position in which spring biased pin 702 extends through apertures 704 and secures track frame 644 to cabinet 610 (shown in FIG. 10). During operation, when moving monitor 606 (shown in FIG. 10) to the closed position, an operator may pull on the safety harness (not shown) to move spring biased pin 702 from the engaging position to a retracted position (not shown) in which spring biased pin 702 does not extend through aperture 694 of leg 700. Drive mechanism 628 (shown in FIG. 9) may then be activated with spring biased pin 702 in retracted position to begin releasing wire harness 636 to move track frame 644 relative to cabinet 610. After track frame 644 has moved such that apertures 704 of bracket 699 and leg 700 are out of alignment, the operator may release the safety harness, causing a biasing member (not shown) to bias spring biased pin 702 to the extended position.

Figure 12:
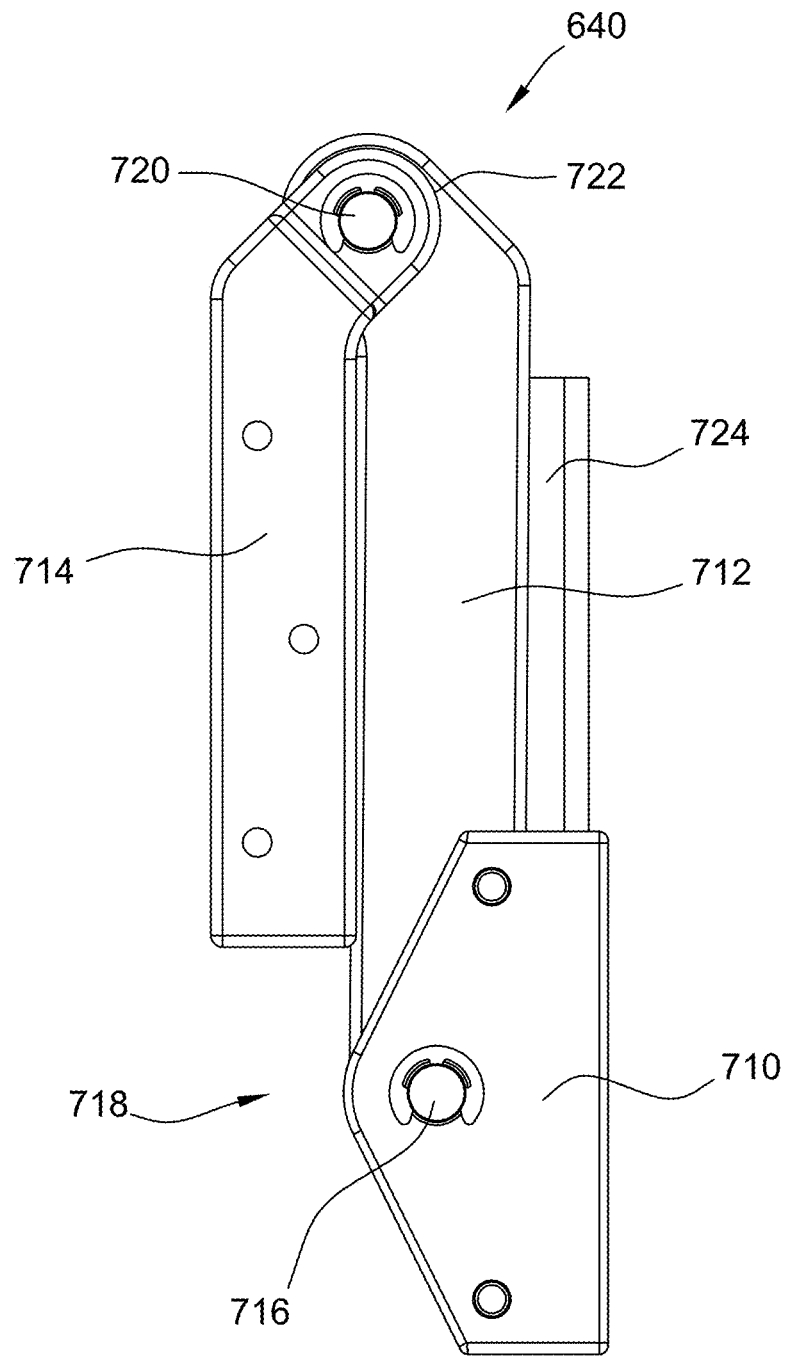
FIG. 12 is a side view of a link for use with the electronic gaming machine shown in FIG. 11.
Figure 13:
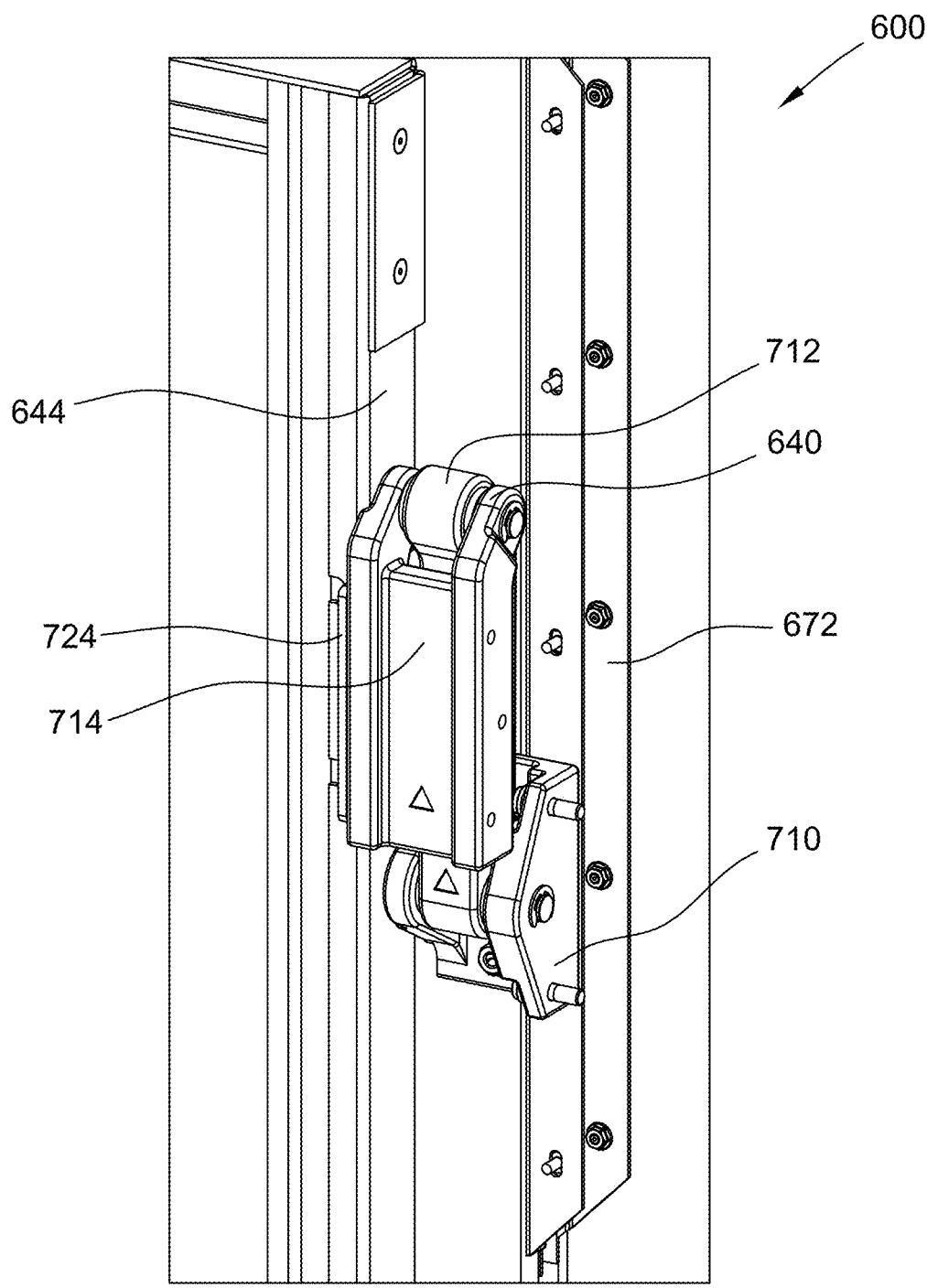
FIG. 13 is a perspective view of a portion of the electronic gaming machine shown in FIG. 9 including the link shown in FIG. 12.

FIG. 12 is a side view of first upper link 640. FIG. 13 is a perspective view of a portion of electronic gaming machine 600 including first upper link 640. In the example embodiment, link 640 includes a mounting bracket 710, a first pivot arm 712 and a second pivot arm 714. A first rotatable coupling 716 extends through mounting bracket 710 and a first end 718 of first pivot arm 712 to rotatably couple first pivot arm 712 to mounting bracket 710. A second rotatable coupling 720 extends through an opposed second end 722 of first pivot arm 712 and through second pivot arm 714 to rotatably couple second pivot arm 714 to first pivot arm 712.

As shown in FIG. 13, second pivot arm 714 is securely attached to a plate 724. Plate 724 is attached track frame 644. Mounting bracket 710 is securely attached to mounting frame 672. In alternative embodiments, second pivot arm 714 is attached to track frame 644 and mounting bracket 710 is attached to cabinet 610 in any manner that enables link 640 to function as described herein. When in the closed position, as shown and described above with respect to FIGS. 4-9, wire harness 636 lifts carriage 632 which applies a lifting force on track frame 644 such that links 640, 642 are oriented in the first position. More specifically, in the example embodiment, first pivot arm 712 is oriented substantially parallel to second pivot arm 714 when link 640 is in the first position. During operation, when drive mechanism 628 is activated, link 640 pivots to a second position (not shown). More specifically in the example embodiment, as drive mechanism 628 is activated, first pivot arm 712 rotates about first rotatable coupling 716 approximately 90 degrees to the second position. Second pivot arm 714 pivots about second rotatable coupling 720 such that second pivot arm 714 maintains substantially the same orientation in the second position as the first position, thereby enabling monitor 606 to pivot outward to the extended position while maintaining the longitudinal orientation of monitor 606 throughout movement of link 640 between the first position and second position.

Figure 14:
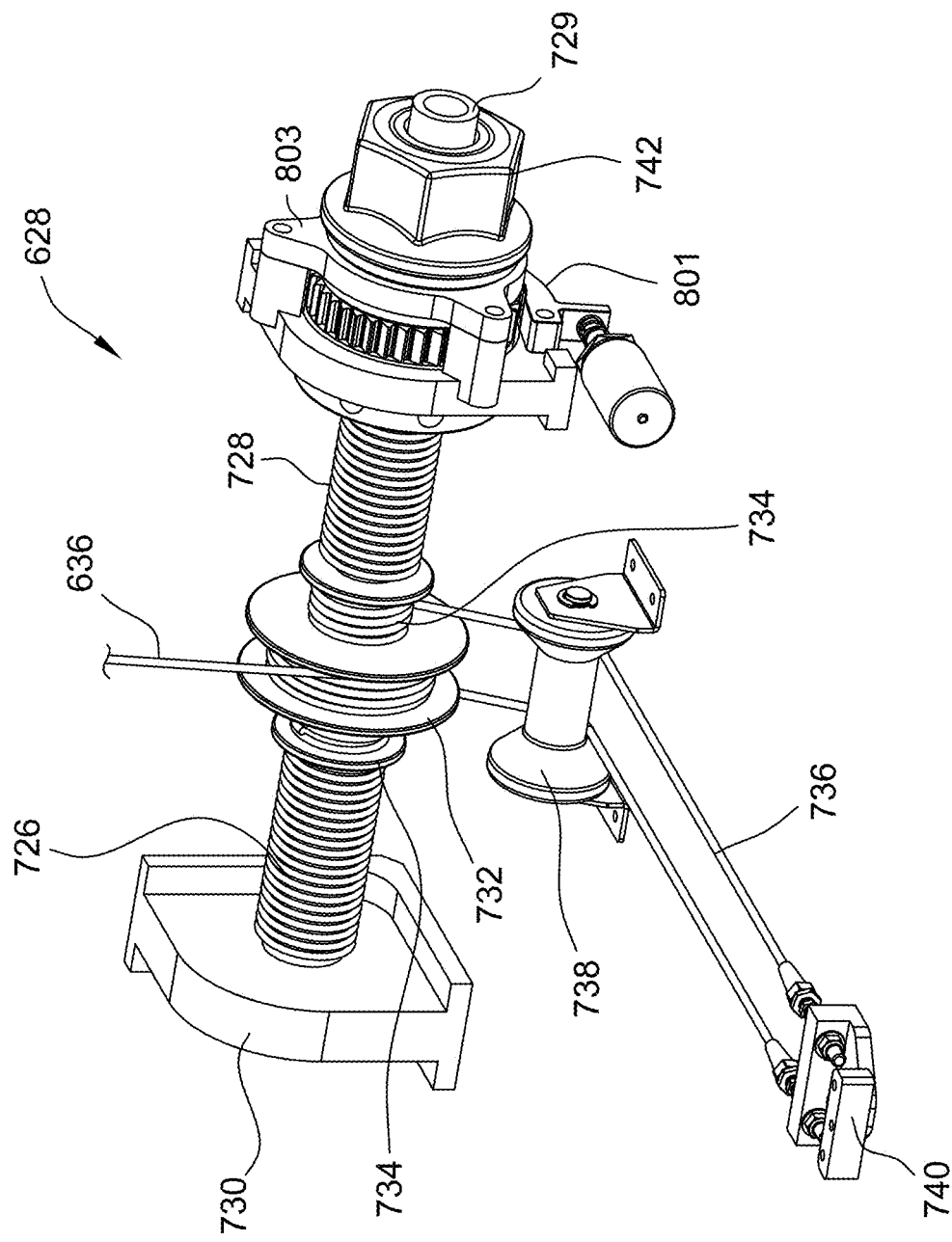
FIG. 14 is a perspective view of a drive mechanism for use with the electronic gaming machine shown in FIG. 9.

FIG. 14 is a perspective view of drive mechanism 628 for use with electronic gaming machine 600 (shown in FIG. 9). In the example embodiment, drive mechanism 628 includes a first biasing element 726 and a second biasing element 728 positioned around a shaft 729. In the example embodiment, first biasing element 726 and second biasing element 728 are torsion springs. In alternative embodiments, first biasing element 726 and second biasing element 728 may be any biasing element that enables drive mechanism 628 to operate as described herein. The shaft 729 extends through a pair of blocks 730 which are configured to be secured to base 616 of cabinet 610 (shown in FIG. 9).

In the example embodiment, drive mechanism 628 further includes a wire harness pulley 732 and a pair of counterweight pulleys 734 on opposed sides of wire harness pulley 732. Wire harness pulley 732 and counterweight pulleys 734 are each attached to the shaft 729. In particular, in the example embodiment, shaft 729 is configured to rotate within blocks 730 to selectively release and retract wire harness 636. In the example embodiment, wire harness 636 is coupled to shaft 729 and coiled about wire harness pulley 732. A pair of cables 736 are coupled to shaft 729 and coiled about respective counterweight pulleys 734. Cables 736 extend from counterweight pulleys 734 through a cable guide 738 and are secured to a coupler 740. Coupler 740 is configured to be attached to a slidable podium, e.g., similar to podium 604 shown in FIG. 4, that may be moved relative to cabinet 610.

In the example embodiment, wire harness 636 and cables 736 are configured to provide a torque on shaft 729 in a first direction (e.g., a clockwise direction in FIG. 14). More specifically, as described above, when monitor 606 is in the closed position, safety release mechanism 698 (shown in FIG. 11) may maintain monitor 606 in the closed position. In some embodiments, when monitor 606 is in the closed position, wire harness 636 may also be under tension (e.g., via biasing elements 726, 728). In particular, in the example embodiment, when monitor 606 is in the closed position, biasing elements 726, 728 are preloaded to apply a torque to shaft 729 that is less than the full weight of monitor 606 and monitor 606 is supported, at least in part, by a stop (e.g., similar to stop 548 shown in FIG. 6) on track frame 544. In alternative embodiments, biasing elements 726, 728 are preloaded to apply a torque approximately equal to the weight of monitor 606 when monitor 606 is in the closed position. In further alternative embodiments, biasing elements 726, 728 are not preloaded and do not apply a torque on shaft 729 when monitor 606 is in the closed position.

Figure 16:
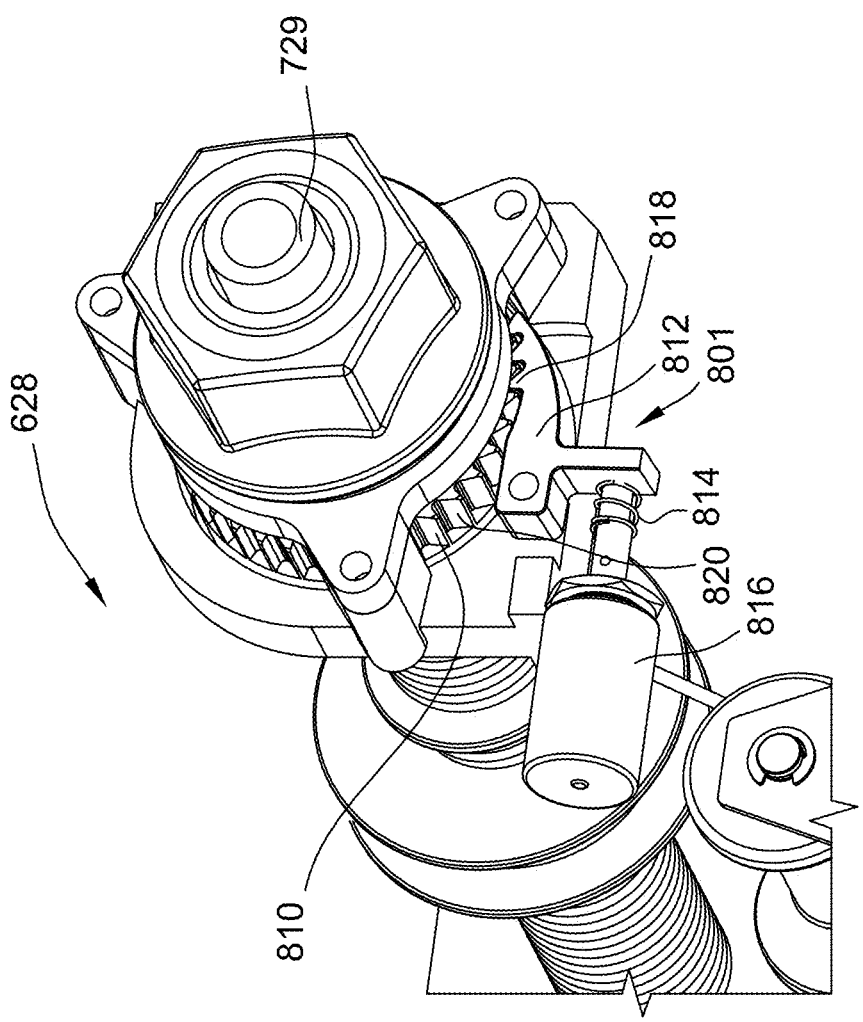
FIG. 16 is a perspective view of the drive mechanism shown in FIG. 15 with the shaft lock in a locked position.
Figure 17:
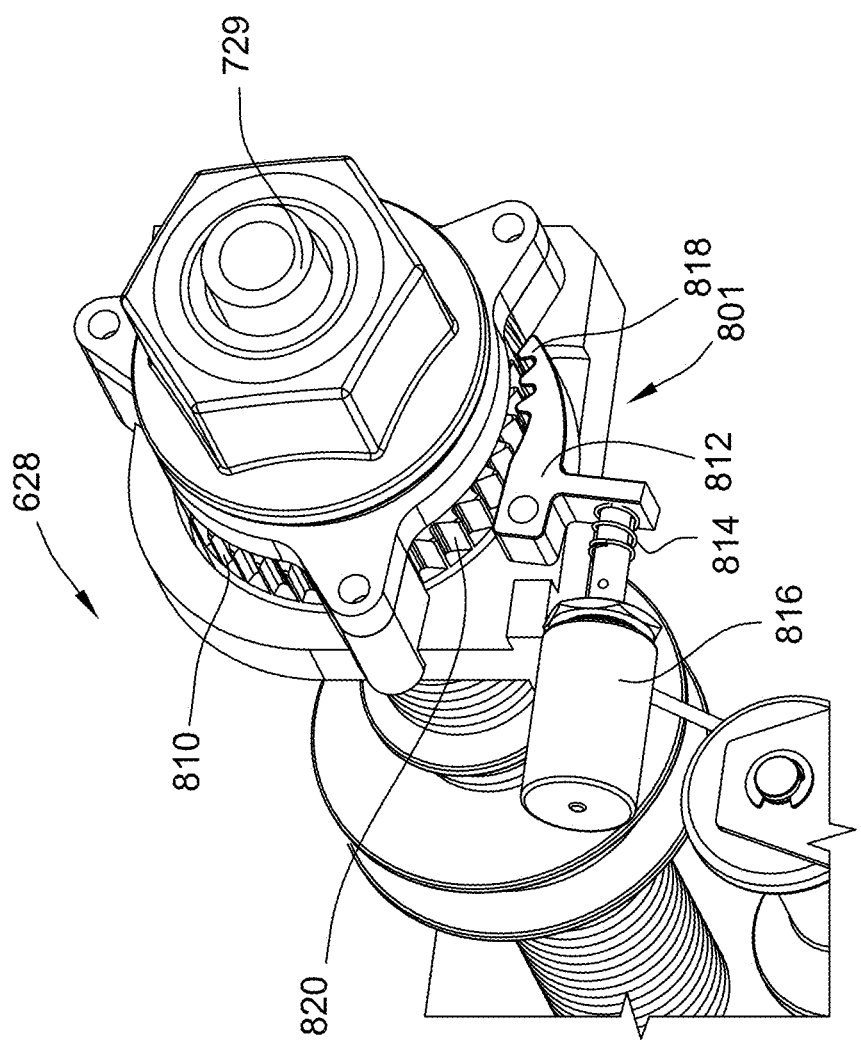
FIG. 17 is a perspective view of the drive mechanism shown in FIG. 15 with the shaft lock in an un-locked position.

In the example embodiment, drive mechanism 628 further includes a release assembly 742 coupled to shaft 729 and configured to selectively control rotation of shaft 729. Release assembly 742 includes a shaft lock 801 engaged with shaft 729 and configured to selectively inhibit rotation of shaft 729 in at least one direction. Shaft lock 801 may be controlled by a mechanical latch (not shown) coupled to shaft 729, a foot pedal (not shown), and/or an electromechanical release (not shown) to transition shaft lock 801 between a locked position, as shown in FIG. 16, and an unlocked position, as shown in FIG. 17. Release assembly 742 also includes a tensioner 803 configured to slow rotation of shaft 729 when shaft lock 801 is released.

Figure 15:
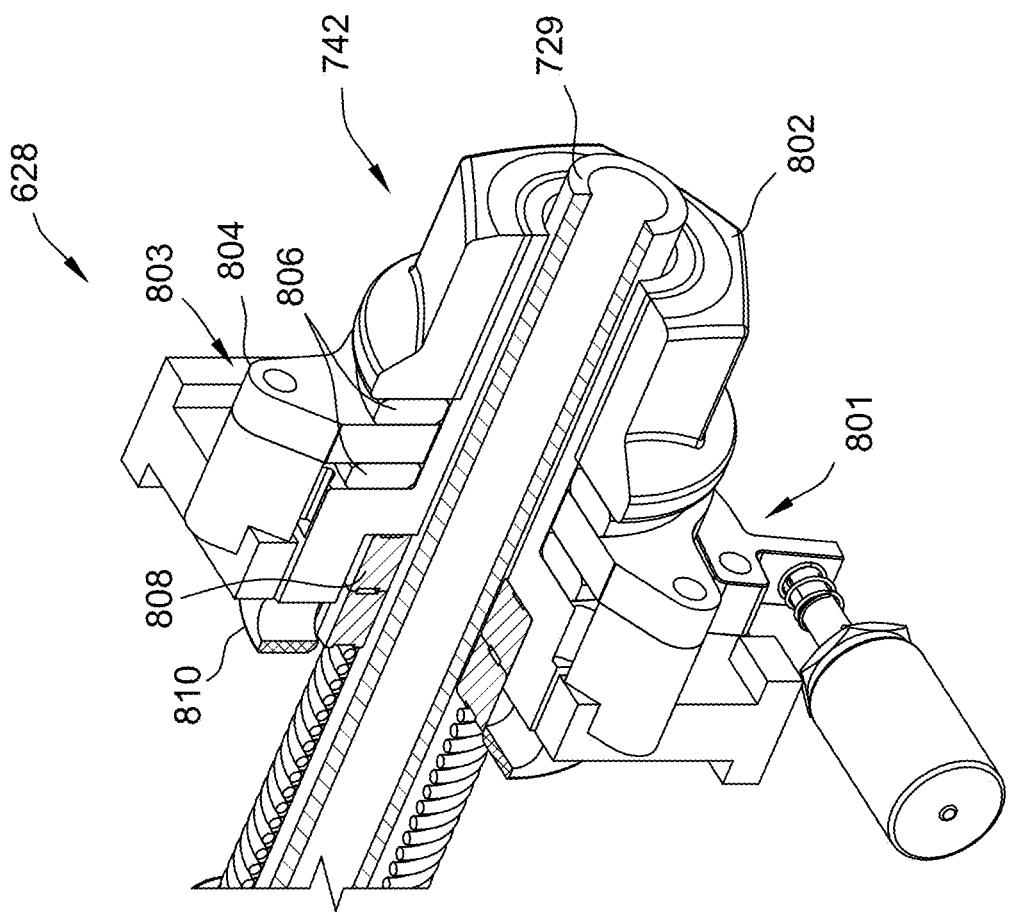
FIG. 15 is a perspective view of the drive mechanism shown in FIG. 9 including a release assembly having a shaft lock and a tensioner.

FIG. 15 is a perspective view of drive mechanism 628 and release assembly 742 including shaft lock 801 and tensioner 803. In the example embodiment, tensioner 803 is configured to frictionally engage shaft 729 and includes a torque nut 802, a pressure plate 804, and inner and outer tensioner pads 806. Torque nut 802, in combination with pressure plate 804 positioned between tensioner pads 806, are coupled to shaft 729 and are collectively configured to control a generally constant rotational speed of shaft 729 during operation. For example, in the example embodiment when monitor 606 is in the lowered position and being moved to the closed position, tensioner 803 inhibits the loaded biasing elements 726, 728 from rapidly rotating shaft 729 and pulling podium 504 to the closed position when podium 504 is in the open positions, as described herein. Likewise, when monitor 606 is in the closed position and being moved to the lowered position, tensioner 803 inhibits wire harness 636 (shown in FIG. 14) from rapidly unwinding on shaft 729. In the example embodiment, torque nut 802 in combination with pressure plate 804 between tensioner pads are configured to apply approximately 385 pounds of clamping force to shaft 729, in order to prevent podium 504 moving to the closed position (e.g., from force applied by biasing elements 726 and 728). In alternative embodiments, tensioner 803 is configured to apply any clamping force that enables release assembly 742 to function as described herein.

FIG. 16 is a perspective view of drive mechanism 628 with an example shaft lock 801 in a locked position. FIG. 17 is a perspective view of drive mechanism 628 with an example shaft lock 801 in an un-locked position. In the example embodiment, Shaft lock 801 includes one or more one-way bearings 808 (shown in FIG. 15) and a brake 810 coupled to shaft 729. Shaft lock 801 further includes a locking latch 812, a spring 814, and a linear solenoid 816. In the example embodiment, locking latch 812 is configured to engage brake 810 to selectively inhibit rotation of shaft 729 in at least one direction. More specifically, in the example embodiment, locking latch 812 includes a plurality of latch teeth 818 that are configured to engage a plurality of ratchet teeth 820 defining a circumferential edge of brake 810. Latch teeth 818 are sized in correspondence with ratchet teeth 820. In particular, in the exemplary embodiment, latch teeth 818 and ratchet teeth 820 each have an asymmetric profile such that, when locking latch 812 is in the locked position, brake 810 may rotate in a first direction (e.g., the clockwise direction as shown in FIG. 16) but is inhibited by locking latch 812 from rotating in a second, opposite direction (e.g., the counter clockwise direction as shown in FIG. 16). In alternative embodiments, shaft lock 801 is configured to inhibit rotation of shaft 729 in at least two directions (e.g., clockwise and counterclockwise directions, as shown in FIG. 16).

As shown in FIGS. 16 and 17, locking latch 812 is coupled to a spring 814, which is coupled to a linear solenoid 816. Shaft lock 801 provides a further measure to ensure podium 504 does not move from the open position to the closed position until an operator controls it to (e.g., by releasing shaft lock 801 and applying force, such as 10 lbs. of force, to podium 504 and/or monitor 506). Accordingly, when podium 504 is in the open position, locking latch 812 is locked as shown in FIG. 16. When an operator desires to move podium 504, and thus monitor 506, to the closed position, the operator may unlock shaft lock 801. For example, as described above, an operator may cause a signal to be sent to solenoid 816 (e.g., by controlling a mechanical latch, foot pedal, electromechanical release, etc.) such that solenoid 816 controls spring 814 to move locking latch 812 to the unlocked position. Once shaft lock 801 is unlocked, an operator can easily move the podium 504 and/or monitor 506 to the closed position by applying minimal force (e.g., because shaft lock 801 is no longer locked).

Referring back to FIG. 14, during operation, monitor 606 (shown in FIG. 9) may be lowered by unlocking safety release mechanism 698 (shown in FIG. 11) and moving the podium, e.g., similar to podium 604 shown in FIG. 4, relative to cabinet 610 to draw cables 736 from counterweight pulleys 734, thereby rotating shaft 729. Rotation of shaft 729 compresses biasing elements 726, 728 and uncoils wire harness 636 from wire harness pulley 732, thereby causing monitor 606 to lower, as described above. Accordingly, in the example embodiment, as cables 736 are uncoiled from counterweight pulleys, biasing elements 726, 728 are loaded and provide a torque in a second direction (e.g., counterclockwise direction in FIG. 14). In particular, the net torque applied by biasing elements 726, 728 increases as monitor 606 is lowered and wire harness 636 is uncoiled from wire harness pulley 732. From the lowered position, monitor 606 may then be raised back to the closed position by lifting monitor 606 and pushing podium 604 towards cabinet 610. In the example embodiment, loading of biasing elements 726, 728 provides a counter directional torque on shaft relative to the torque applied by wire harness 636. Accordingly, in the example embodiment, biasing elements 726, 728 reduce the net force required by an operator to raise monitor 606 from the lowered position. In the example embodiment, as monitor 606 is raised, biasing elements 726, 728 are unloaded and provide negligible net torque when monitor 606 is in the closed position. In alternative embodiments, biasing elements 726, 728 are configured to apply a torque on shaft 729 when monitor 606 is lifted in the closed position. For example, in some embodiments, a net torque applied on shaft 729 by wire harness 636 and biasing elements 726, 728 when monitor 606 is in the closed position is near zero. In alternative embodiments, biasing elements 726, 728 are loaded in any manner that enables drive mechanism 628 to operate as described herein.

Figure 18:
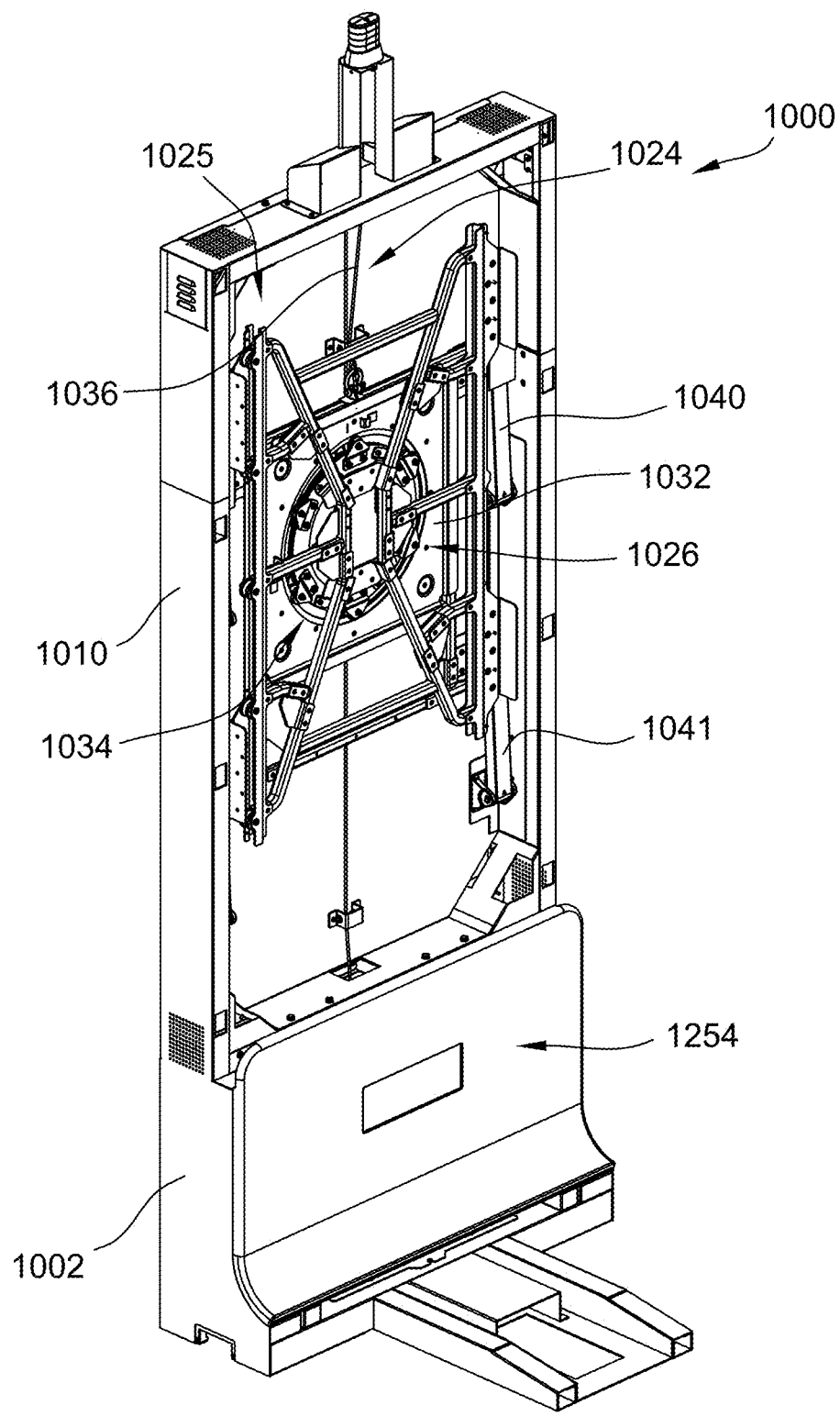
FIG. 18 is a perspective view of a portion of another alternative electronic gaming machine, with a monitor removed to reveal internal construction.

FIG. 18 is a front perspective view of an alternative electronic gaming machine 1000 with certain portions (e.g., such as the monitor) removed for clarity. Electronic gaming machine 1000 is substantially the same as electronic gaming machine 500 (shown in FIGS. 4-8) and 600 (shown in FIGS. 9-13), except as described below. In particular, in the exemplary embodiment, gaming machine 1000 includes a pedestal 1002 that includes a mounting assembly 1025 configured to removably couple monitor 1006 (shown in FIG. 23) to cabinet 1010. Mounting assembly 1025 includes a lift assembly, indicated generally at 1024, and a display mount, indicated generally at 1026. Display mount 1026 and lift assembly 1024 are operable to selectively move monitor 1006 between the closed position (shown in FIG. 18) and an extended lowered position (shown in FIGS. 25 and 26). However, in the exemplary embodiment, bearing assembly 1034 is configured as a rotating gimbal for rotating the monitor 1006 relative to cabinet 1010. Moreover, in the exemplary embodiment, links 1040, 1041 are directly coupled to carriage 1032 (i.e., carriage 1032 is not received within a track frame 544, 644 as shown in FIGS. 6 and 10).

Figure 19:
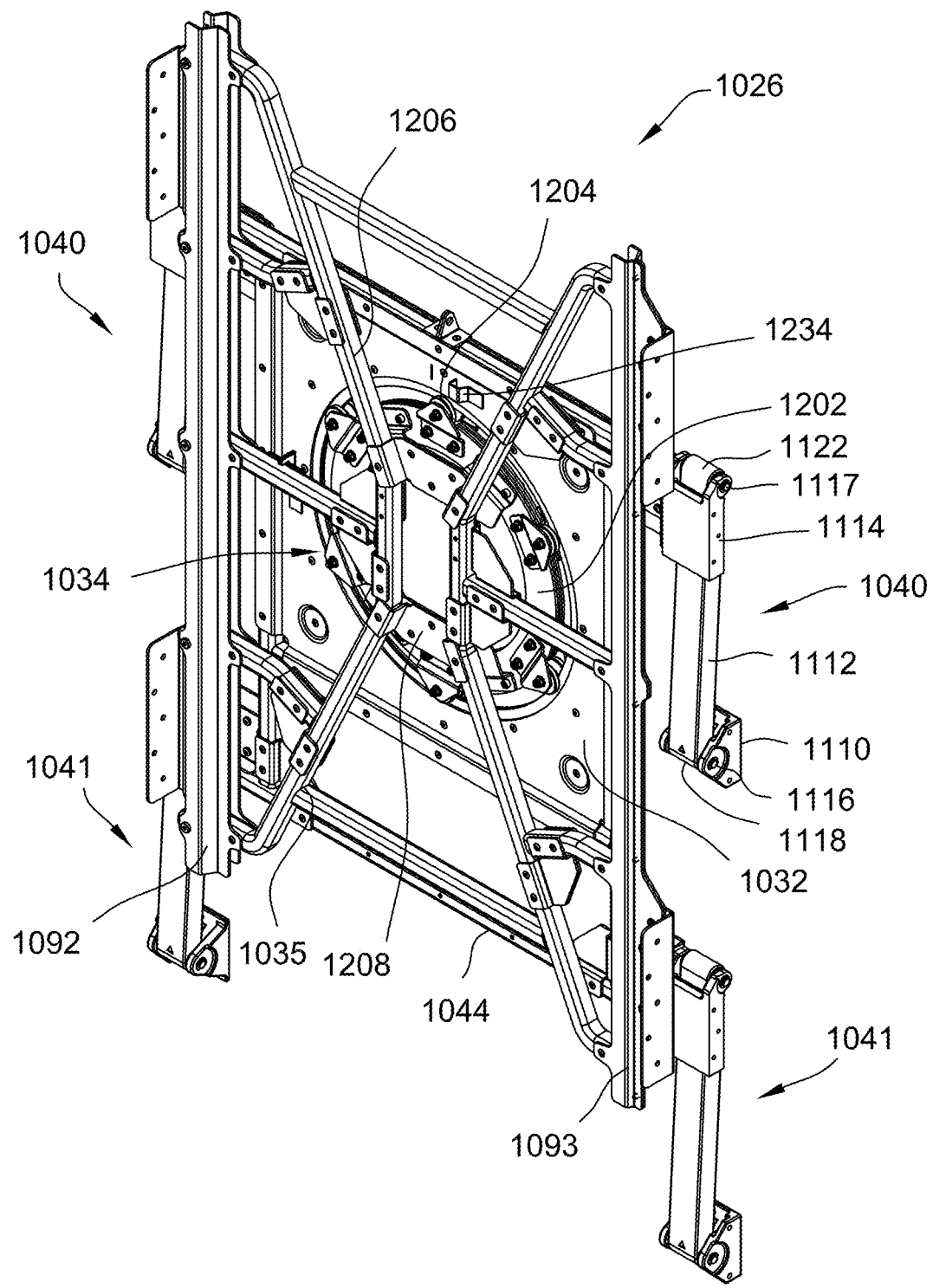
FIG. 19 is a front perspective view of a display mount of the portion of the electronic gaming machine shown in FIG. 14.

Referring to FIG. 19, in the exemplary embodiment display mount 1026 includes a pair of upper links 1040 and a pair of lower links 1042. Display mount 1026 further includes carriage 1032 and a rotatable frame 1035 rotatably coupled to carriage 1032. Links 1040, 1041 are substantially identical and are each rotatably coupled to cabinet 1010 (shown in FIG. 18) and carriage 1032. In the example embodiment, each link 640 includes a mounting bracket 1110, a first pivot arm 1112 and a second pivot arm 1114. A first rotatable coupling 1116 extends through mounting bracket 1110 and a first end 1118 of first pivot arm 1112 to rotatably couple first pivot arm 1112 to mounting bracket 1110. A second rotatable coupling 1117 extends through an opposed second end 1122 of first pivot arm 1112 and through second pivot arm 1114 to rotatably couple second pivot arm 1114 to first pivot arm 1112.

In the example embodiment, second pivot arm 1114 is securely attached to a mount plate 1124 (FIG. 20) which attaches to a carriage frame 1044. Mounting bracket 1110 is configured to be securely attached to cabinet 1016 (FIG. 18). In alternative embodiments, second pivot arm 1114 is attached to carriage frame 1044 and mounting bracket 1110 is attached to cabinet 1010 in any manner that enables links 1040, 1041 to function as described herein. When in the closed position, as shown in FIG. 18, wire harness 1036 lifts carriage 1032, which applies a lifting force on carriage frame 1044 such that links 1040, 1041 are oriented in the first position. More specifically, in the example embodiment, first pivot arm 1112 is oriented substantially parallel to second pivot arm 1114 when links 1040, 1041 are in the first position. During operation, when the drive mechanism (e.g., similar to drive mechanism 528, 628) is activated, links 1040, 1041 pivot to a second position (shown in FIG. 23) and a third position (shown in FIG. 26). More specifically in the example embodiment, as the drive mechanism is activated, first pivot arm 1112 rotates about first rotatable coupling 1116 to the second position. Second pivot arm 1114 pivots about second rotatable coupling 1116 such that second pivot arm 1114 maintains substantially the same orientation in the second position as the first position, thereby enabling monitor 1006 to pivot outward to the extended position while maintaining the longitudinal orientation of monitor 1006 throughout movement of links 1040, 1041 between the first position and second position.

In the exemplary embodiment, bearing assembly 1034 includes a central ring 1202 attached to rotatable frame 1035 and a plurality of rollers 1204 (also referred to as "sliding connectors" herein) extending radially outward from central ring 1202. Rotatable frame 1035 includes end rails 1092, 1093, and a plurality of cross bars 1206 coupling central ring 1202 to end rails 1092, 1093. In particular, monitor (shown in FIG. 22) is configured to be mounted to rotatable frame 1035 at end rails 1092, 1093. Cross bars 1206 are mounted to central ring 1202 by mounting plates 1208 extending between cross bars 1206 and central ring 1202. In particular, in the exemplary embodiment, mounting plates 1208 are fastened to central ring 1202. In other embodiments, one or more of cross bars 1206, mounting plates 1208, and/or central ring 1202 may be integrally formed as a single structure.

Figure 20:
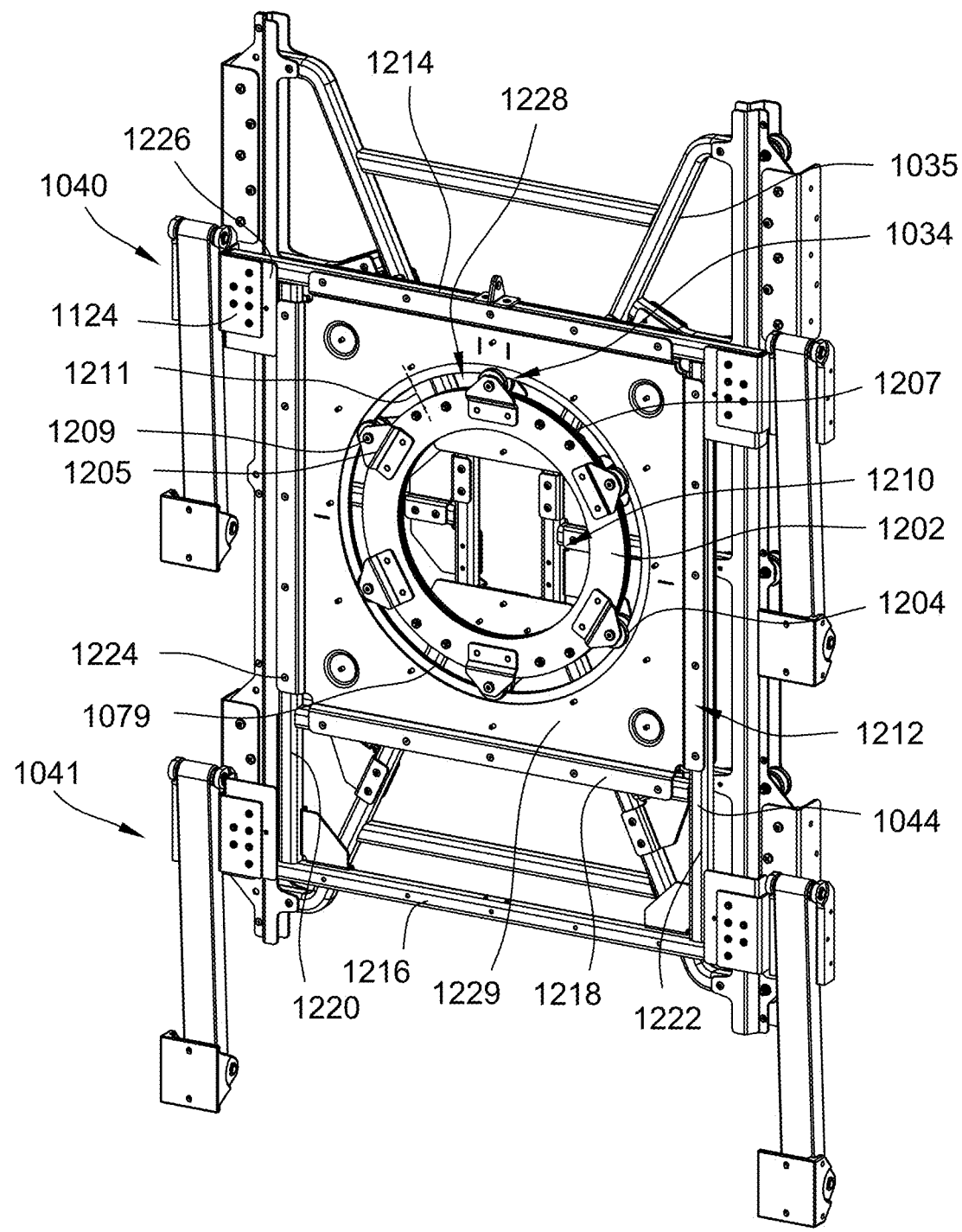
FIG. 20 is a rear perspective view of the display mount shown in FIG. 15.

Referring to FIG. 20, in the exemplary embodiment, rollers 1204 are each coupled to central ring 1202 by plurality of roller mounts 1205 extending radially outward beyond a circumferentially outer surface 1207 of central ring 1202. A radial gap 1211 is defined radially between the outer surface 1207 of central ring 1202 and the carriage 1032. A shaft 1209 extends between the roller mounts 1205 and the rollers 1204 to enable rotation of the rollers 1204 relative to the roller mounts 1205. In the exemplary embodiment, rollers 1204 and roller mounts 1205 are substantially equidistantly spaced circumferentially about the outer surface 1207. Moreover, in the exemplary embodiment, central ring 1202 defines a circumferentially inner opening 1210. However, the term "ring," as used herein, should not be understood to require the presence of an opening 1210 within central ring 1202 and it should be understood that, in other embodiments, central ring 1202 extends continuously and does not define the opening 1210.

In the exemplary embodiment, carriage 1032 includes a body 1212 and carriage frame 1044, which is coupled to and surrounds body 1212. Carriage frame 1044 includes an upper frame bar 1214, a lower frame bar 1216, an intermediate frame bar 1218, and first and second side bars 1220, 1222. First and second side bars 1220, 1222 are each coupled to and extend between upper and lower frame bars 1214, 1216 such that the frame bars collectively define a generally rectangular profile surrounding body 1212. Intermediate frame bar 1218 extends transversely between first and second side bars 1220, 1222 at a position between upper frame bar 1214 and lower frame bar 1216. Carriage body 1212 is coupled to upper frame bar 1214, intermediate frame bar 1218, and first and second side bars 1220, 1222 by a plurality of fasteners 1224. In other embodiments, carriage frame 1044 may have any suitable configuration that enables carriage 1032 to function as described herein.

In the exemplary embodiment, carriage 1032 further includes a plurality of frame plates 1226 for coupling links 1040, 1041 to carriage 1032. Mount plates 1124 are each positioned proximate one of the intersections between upper frame bar 1214, lower frame bar 1216, and first and second side bars 1220, 1222. Each of the links 1040, 1041 are coupled to a mount plate 1124, which couples to a respective one of the frame plates 1226 on carriage 1032 to secure carriage 1032 to links 1040, 1041. Accordingly, and as described in greater detail below, during operation pivoting of the links 1040, 1041 causes a corresponding movement of carriage 1032.

In the exemplary embodiment, carriage body 1212 includes an arcuately extending, or circumferentially extending (used interchangeably herein), inner guide track 1079 of bearing assembly 1034, which defines a central opening 1228 within carriage body 1212. Central ring 1202 of rotatable frame 1035 is received within central opening 1228 and rollers 1204 engage guide track 1079 to rotatably secure rotatable frame 1035 within carriage 1032. Guide track 1079 is recessed relative to an outer surface 1229 of carriage body 1212 and carriage 1032 circumscribes central ring 1202 and rollers 1204 within opening 1228. In the exemplary embodiment, roller elements 1204 are grooved rollers that receive a portion of guide track 1079 therein, though in other embodiments, any suitable rollers 1204 or sliding connectors may be used.

Figure 21:
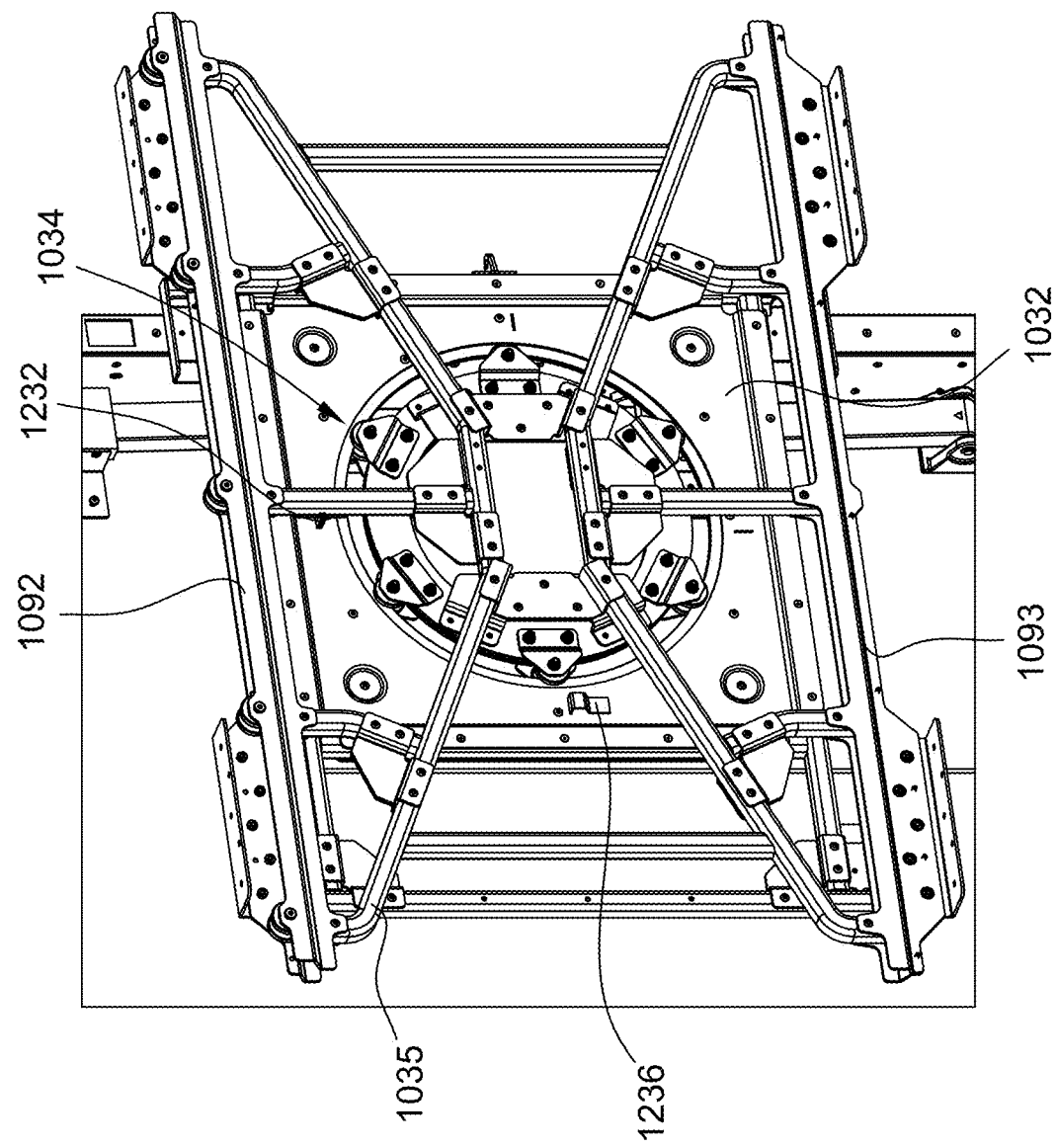
FIG. 21 is a front perspective view of the display mount shown in FIG. 19 rotated in a landscape orientation.

In the exemplary embodiment, the rotatable coupling between rotatable frame 1035 and carriage 1032 enables rotatable frame 1035, and, as a result, display monitor 1006, to be rotated relative to carriage 1032 between a portrait orientation as shown in FIGS. 18-20, and a landscape orientation, as shown in FIG. 21. In the portrait orientation, end rails 1092, 1093 (FIG. 19) are oriented substantially parallel to a longitudinal axis $l_1$ (FIG. 23) of gaming machine 1000. In the landscape orientation, end rails 1092, 1093 are oriented substantially perpendicular to the longitudinal axis $l_1$ of gaming machine 1000, as shown in FIG. 21.

Referring to FIG. 21, in the exemplary embodiment, rotatable frame 1035 includes a stop 1232 coupled to cross bar 1206. Stop 1232 is configured to engage corresponding stop hooks 1234, 1236 coupled to carriage 1032 to limit rotational movement of rotatable frame 1035 circumferentially between the landscape orientation and the portrait orientation. In particular, in the exemplary embodiment, carriage 1032 includes a first stop hook 1234 (shown in FIG.

19) which engages pivot frame stop 1232 when rotatable frame 1035 is in the landscape orientation (e.g., as shown in FIG. 21). Carriage 1032 further includes a second stop hook 1236 which engages pivot frame stop 1232 when rotatable frame 1035 is in the portrait orientation. In the exemplary embodiment, first stop hook 1234 is spaced circumferentially around central opening 1228 approximately ninety degrees from second stop hook 1236 to limit the rotation of rotatable frame 1035 within the ninety-degree orientation span between the portrait and landscape orientations. In other embodiments, bearing assembly 1034 may include any stop features that enable bearing assembly 1034 to restrict rotation of rotatable frame 1035 as described herein. In yet further embodiments, bearing assembly 1034 does not include any stop features, such that rotatable frame 1035 may rotate a full 360 degrees relative to carriage 1032. In the exemplary embodiment, when monitor 1006 is in the closed position, monitor 1006 may be secured in the portrait orientation by one or more removable fasteners (not shown) which lock the monitor 1006 in position relative to cabinet 1010. Moreover, in some embodiments bearing assembly 1034 may include one or more locking features (not shown) that facilitate locking rotational movement of rotatable frame 1035 relative to carriage 1032. For example, and without limitation, in some embodiments, at least one of carriage 1032 or rotatable frame 1035 may include a compressed pin-lock (not shown) which engages an aperture of the other of the at least one of carriage 1032 and rotatable frame 1035 to lock rotatable frame 1035 in a desired orientation. In other embodiments, bearing assembly 1034 includes a latch (not shown) for locking a rotational position of rotatable frame 1035.

Figure 22:
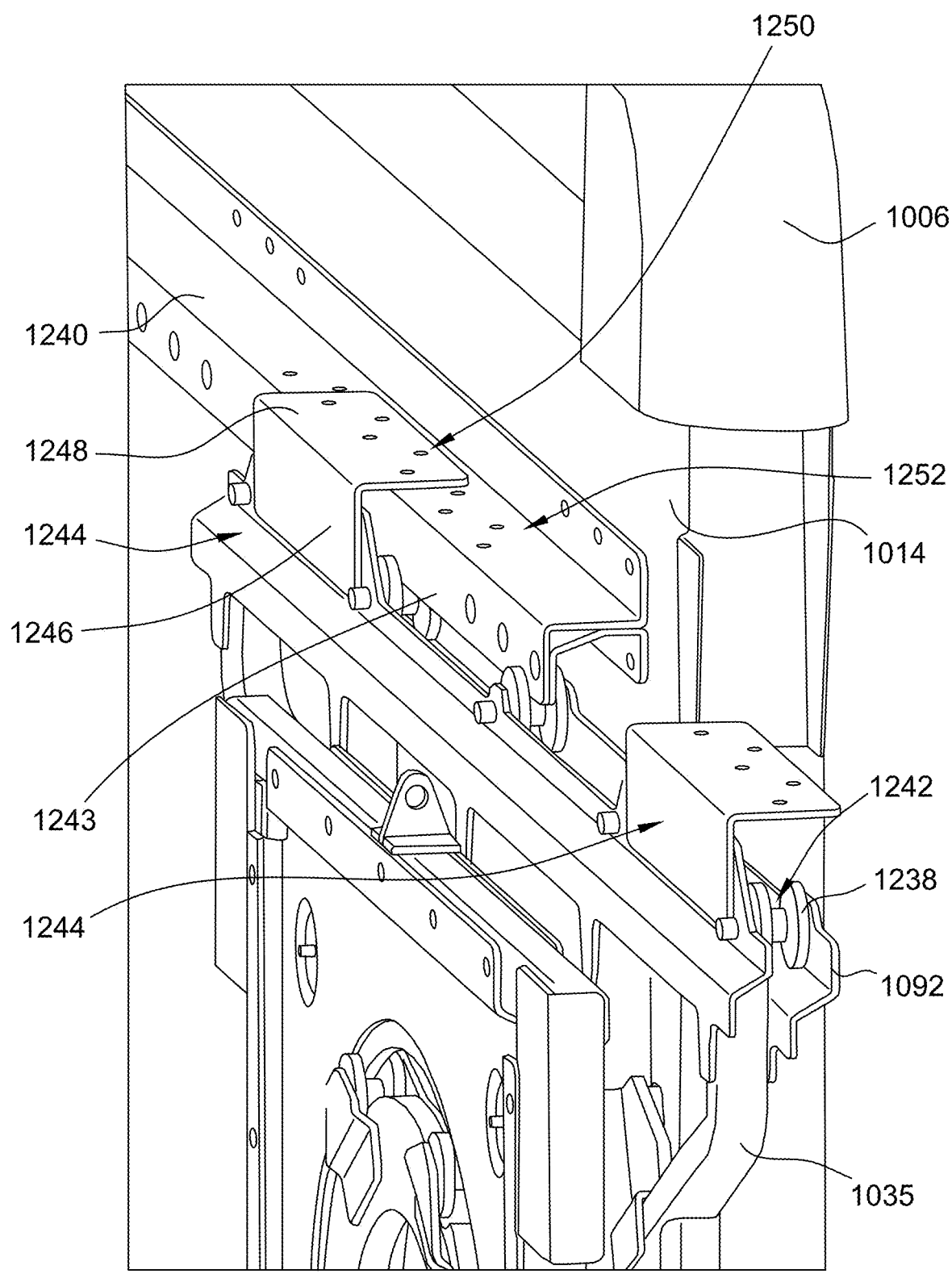
FIG. 22 is an enlarged perspective view of the display mount shown in FIG. 19 and a portion of a monitor for use with the portion of the electronic gaming machine shown in FIG. 18.

Referring to FIG. 22, in the exemplary embodiment, first end rail 1092 of rotatable frame 1035 includes a plurality of rollers 1238 spaced along a length of the first end rail 1092 for guiding a mount bar 1240 of the monitor 1006 into position on rotatable frame 1035 during assembly. In particular, rollers 1238 enable sliding insertion of mount bar 1240 along first end rail 1092 and reduce frictional interference between mount bar 1240 and first end rail 1092 during assembly. In the exemplary embodiment, rollers 1238 on first end rail 1092 are grooved roller similar to rollers of bearing assembly 1034. That is, each roller 1238 defines a groove 1242 sized to receive a transverse projection 1243 of mount bar 1240 therein. In other embodiments, any suitable rollers 1238 may be used. Moreover, in the exemplary embodiment, second end rail 1093 (FIG. 21) does not include rollers 1238, though in other embodiments second end rail 1093 may include similar rollers 1238 as described herein with respect to first end rail 1092. In yet further embodiments, first and second end rails 1092, 1093 may not include rollers 1238.

In the exemplary embodiment, a pair of coupling flanges 1244 are each coupled proximate opposite ends of first end rail 1092. Flanges 1244 each include a first sidewall 1246 extending outward from first end rail 1092 and a second sidewall 1248 extending transversely from first sidewall 1246 and over first end rail 1092. Second sidewall 1248 defines a first plurality of mounting apertures 1250 therein. First plurality of mounting apertures 1250 are each positioned in correspondence with a respective second plurality of mounting apertures 1252 defined in the mount bar 1240 of display frame 1014. Accordingly, during operation, an operator may attach display frame 1014 to rotatable frame 1035 by sliding mount bar 1240 along rollers 1238 in first end rail 1092 until mounting apertures 1250 on flanges 1244 are aligned with the corresponding apertures 1252 on mount bar 1240. Once the apertures 1250, 1252 are positioned in alignment, fasteners (not shown) may be inserted to attach mount bar 1240 to flanges 1244. In the exemplary embodiment, second end rail 1093 includes similar flanges for coupling to a second mount bar (not shown) of monitor 1006 in substantially the same manner as described above with respect to first end rail 1092.

Figure 23:
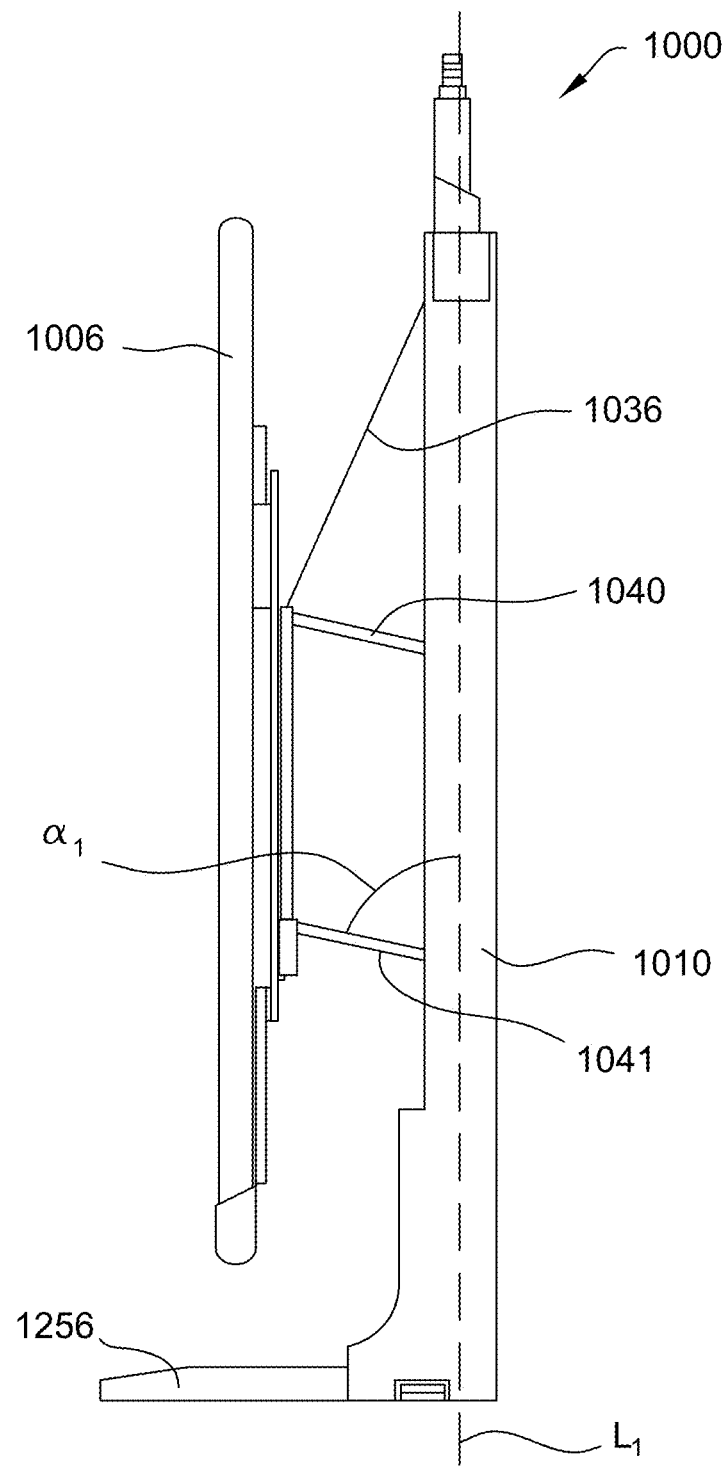
FIG. 23 is a side view of the portion of the electronic gaming machine shown in FIG. 18 showing the display mount in a first extended position and in a portrait orientation.
Figure 24:
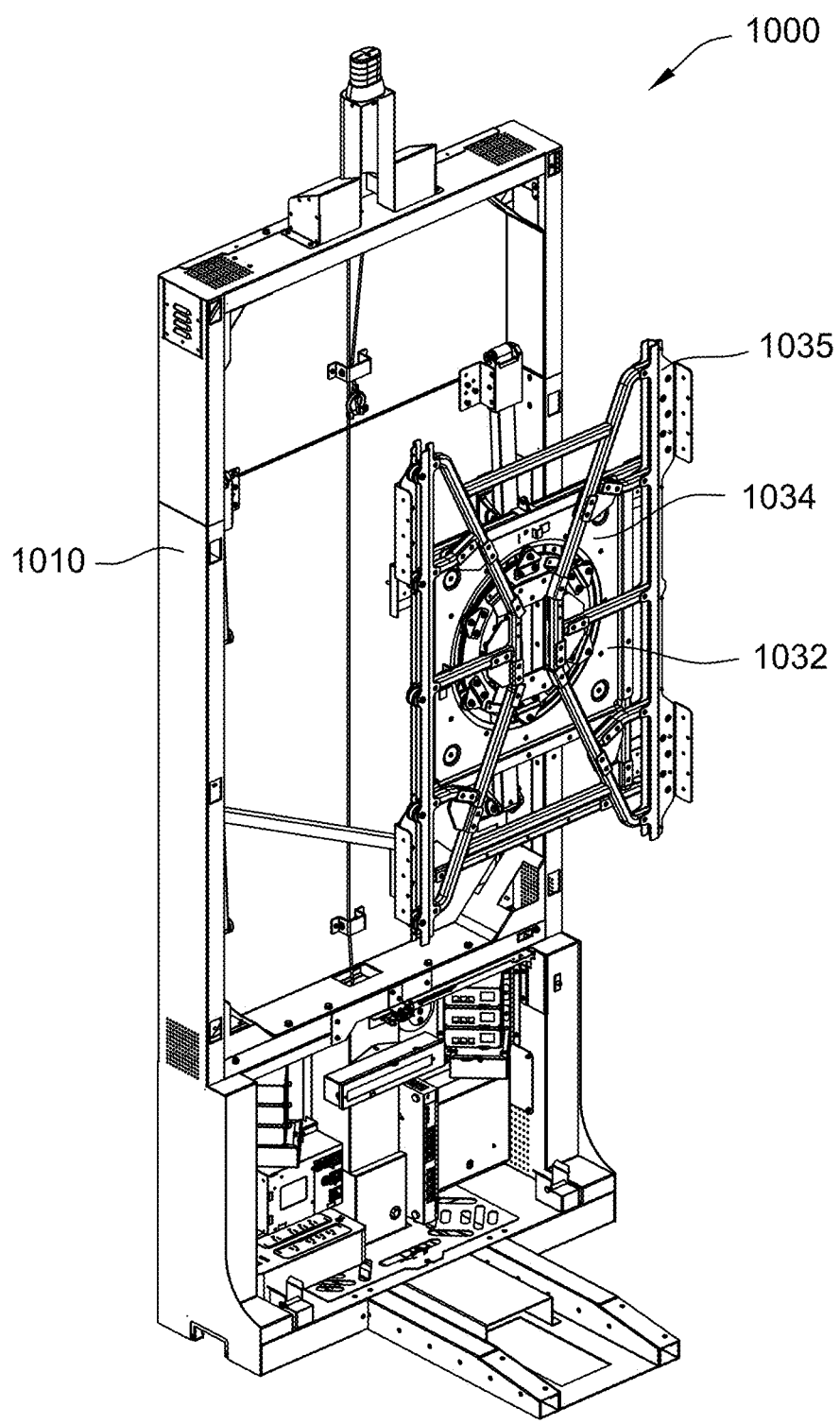
FIG. 24 is a perspective view of a portion of the electronic gaming machine shown in FIG. 23 with the monitor and upper links removed.

Referring to FIGS. 23-27, in the example embodiment, to remove monitor 1006 from cabinet 1010 with monitor 1006 in the closed position, an operator may first remove a pedestal door 1254 (FIG. 18) to access a drive mechanism (e.g., similar to drive mechanism 528 shown in FIG. 6) an control selective release of wire harness 1036. Operator may further first release one or more safety mechanisms (not shown) which inhibit release of wire harness 1036 and remove one or more removable fasteners (not shown) which secure monitor 1006 in position on cabinet 1010. When in the closed position (shown in FIG. 18), selective release of wire harness 1036 causes links 1040, 1041 to pivot to a second position, as shown in FIGS. 23 and 24, in which monitor 1006 is laterally spaced from, and lowered relative to cabinet 1010. In the second position, monitor 1006 is also vertically spaced a sufficient distance above pedestal feet 1256 and/or a floor surface (not shown) to enable selective rotation of monitor 1006 from the portrait orientation to the landscape orientation. During operation, once in the second position, further lowering of monitor 1006 may be stopped and monitor 1006 is rotated to the landscape orientation. In the exemplary embodiment, when in the second position, links 1040, 1041 are each oriented at a first angle $\alpha_1$ with the longitudinal axis $l_1$ of gaming machine 1000 in a first direction (e.g., in the clockwise direction as shown in FIG. 23). The first angle $\alpha_1$ of links 1040, 1041 in the second position may be between 45 degrees and 90 degrees, 55 degrees and 80 degrees, or between 65 degrees and 75 degrees. In the exemplary embodiment, first angle $\alpha_1$ of links 1040, 1041 in the second position is approximately 70 degrees.

Figure 25:
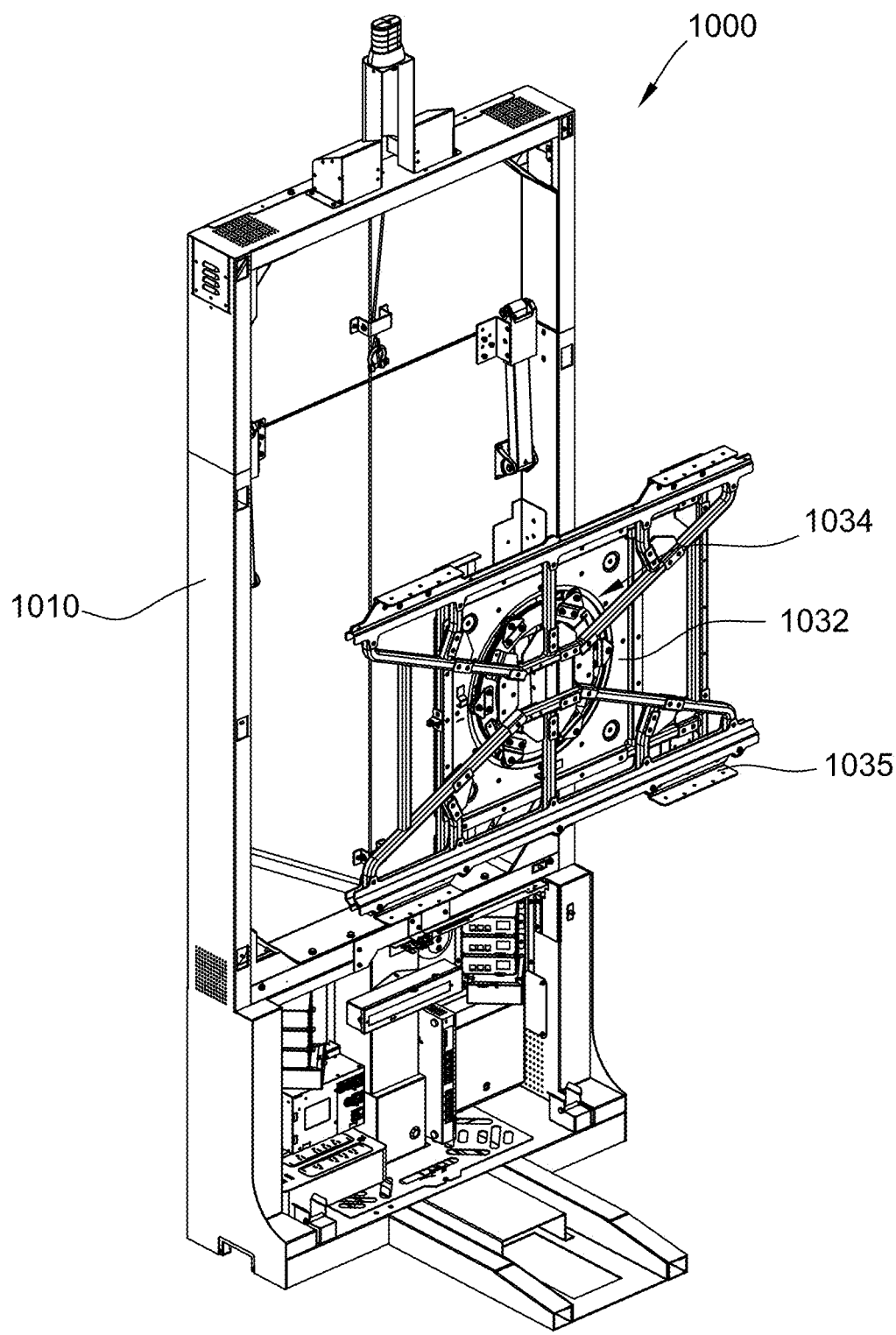
FIG. 25 is a perspective of the portion of the electronic gaming machine shown in FIG. 23 showing the display mount in the first extended position and rotated in a landscape orientation.

Referring to FIGS. 24 and 25, with the monitor 1006 and/or rotatable frame 1035 in the second position, rotatable frame 1035 may be rotated 90 degrees about carriage 1032 to the landscape orientation, as shown in FIG. 25. For example, the operator controlling drive mechanism may hold drive mechanism and manually rotate monitor 1006 to the landscape orientation. Alternatively, an additional operator may rotate monitor 1006 once release of wire harness 1036 by the drive mechanism is paused.

Figure 26:
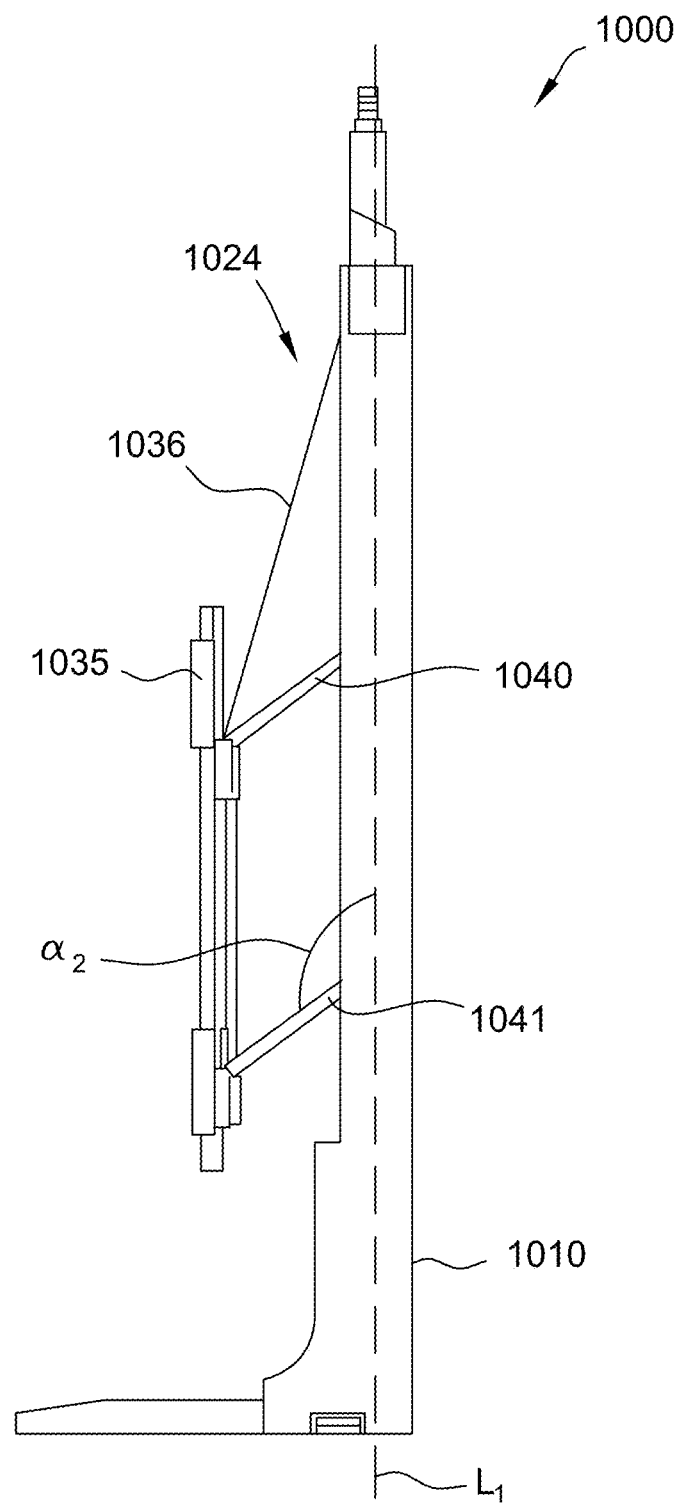
FIG. 26 is a side view of the portion of the electronic gaming machine shown in FIG. 25 showing the display mount in a second extended position.
Figure 27:
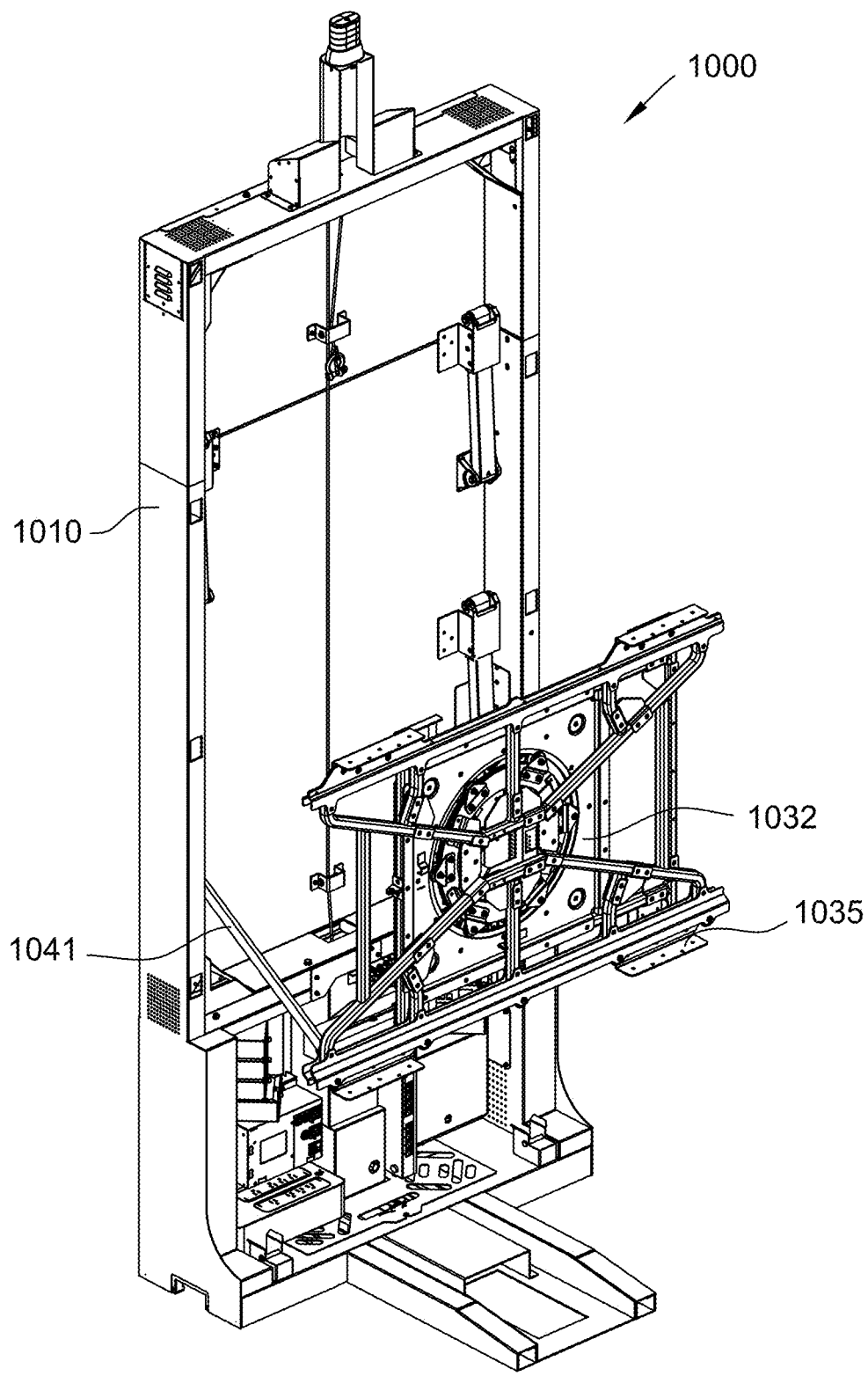
FIG. 27 is a perspective view of the portion of the electronic gaming machine shown in FIG. 26.

With monitor 1006 and rotatable frame 1035 in the landscape orientation, the drive mechanism is activated to lower monitor 1006 until monitor 1006 is in the lowered position, as shown in FIGS. 26 and 27. In the exemplary embodiment, when in the lowered position, links 1040, 1041 are each oriented at a second angle $\alpha_2$ with the longitudinal axis $l_1$ in the first direction (e.g., in the clockwise direction as shown in FIG. 26). The second angle $\alpha_2$ of links 1040, 1041 in the second position may be between 170 degrees and 90 degrees, 150 degrees and 100 degrees, or between 130 degrees and 110 degrees. In the exemplary embodiment, second angle $\alpha_2$ of links 1040, 1041 in the second position is approximately 120 degrees.

In the exemplary embodiment, once in the lowered position, lift assembly 1024 prevents further lowering of carriage 1032 and monitor 1006 on rotatable frame 1035. For example, in some embodiments, wire harness 1036 may be a predetermined length such that lowering of monitor 1006 beyond the lowered position is prevented. Additionally or alternatively, at least one of the drive mechanism, wire harness 1036, and links 1040, 1041, may include a stop (not shown) which prevents lowering of monitor 1006 beyond the predetermined point. For example and without limitation, in some embodiments, wire harness 1036 includes a block (not shown) fixed to wire harness 1036 at a predetermined point such that, when monitor 1006 is in the lowered position, the block engages a component of cabinet 1010 and/or lift assembly 1024, thereby preventing further release of wire harness 1036. In further alternative embodiments, links 1040, 1041 may include a stop (not shown) that prevents rotation of first links 1040, 1041 beyond a predetermined point. In yet further embodiments, cabinet 1010 may additionally or alternatively include stop (not shown) that engages links 1040, 1041 when in the lowered position and prevents further rotation of links 1040, 1041.

In the example embodiment, with monitor 1006 in the lowered position, monitor 1006 may be decoupled from cabinet 1010 by disconnecting monitor 1006 from rotatable frame 1035 and lifting monitor 1006 off carriage 1032. For example, one operator may hold the monitor 1006 at each end and lift monitor 1006 from carriage 1032. Moreover, a new monitor (not shown) or monitor 1006 may be coupled to carriage 1032 and moved to the closed position in substantially the reverse order of the steps described above.

Exemplary technical effects of the methods, systems, and apparatus described herein include at least one of: (a) facilitating manual removal of monitors for servicing, installation, and/or removal; (b) improved ease of access for operators to internal monitor components and/or small confines of an EGM; (c) improved life span of EGM by enabling replacement of monitors; (d) reduced complexity in servicing, installation, and/or removal of monitors, facilitating a non-technical operator to perform maintenance without technician assistance; (e) reduced overall time required in servicing, installation, and/or removal of monitors as compared with at least some known monitor removal systems.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming machine comprising:
   a cabinet;
   a monitor configured to display an electronic game;
   a mount configured to secure the monitor to the cabinet, the mount including a carriage coupled to the monitor and a linkage assembly, the linkage assembly including a track frame and a link pivotably coupled to the cabinet and the track frame, the carriage being slidably coupled to the track frame; and
   a lift assembly for moving the mount relative to the cabinet, the lift assembly comprising:
      a harness coupled to the carriage; and
      a drive mechanism coupled to the harness and operable to selectively release and retract the harness to pivot the track frame relative to the cabinet and slide the carriage along the track frame for moving the monitor relative to the cabinet.

2. The electronic gaming machine of claim 1, wherein the lift assembly is operable to move the monitor between a closed position, in which the mount is positioned within the cabinet, and an extended position, in which the mount is laterally spaced from cabinet.

3. The electronic gaming machine of claim 2, wherein the mount further comprises a rotatable frame coupled to the monitor and a bearing assembly rotatably coupling the rotatable frame to the carriage for rotating the monitor relative to the cabinet when the monitor is in the extended position.

4. The electronic gaming machine of claim 3, wherein the bearing assembly includes an arcuately extending guide track and a sliding connector moveably engaged with the guide track, wherein movement of the sliding connector along the guide track causes the monitor to rotate relative to the cabinet.

5. The electronic gaming machine of claim 1, wherein the lift assembly further comprises a pulley coupled to the cabinet and positioned above the mount, the harness extending from the drive mechanism, through the pulley, and to the carriage.

6. The electronic gaming machine of claim 1, wherein the lift assembly is operable to move the monitor between a closed position, in which the mount is positioned within the cabinet, and an extended position, in which the mount is laterally spaced from cabinet, the cabinet including a stop that engages the mount when the monitor is in the extended position, and wherein selective release of the harness causes the carriage to move relative to the frame when the stop is engaged with the mount.

7. The electronic gaming machine of claim 1, wherein the carriage includes a frame and a body positioned within the frame, and wherein the link comprises a first arm rotatably coupled to the cabinet and a second arm secured to the frame and rotatably coupled to the first arm.

8. The electronic gaming machine of claim 1, wherein the drive mechanism includes a winch and the harness is coiled around the winch.

9. The electronic gaming machine of claim 1, wherein the electronic gaming machine defines a longitudinal axis, the lift assembly being operable to move the monitor between a closed position, in which the link is oriented parallel to the longitudinal axis, and an extended position, in which the link extends outward from the cabinet.

10. The electronic gaming machine of claim 9, wherein the link moves along an arc relative to the longitudinal axis as the monitor is moved between the closed position and the extended position, and wherein the arc subtends an angle that is approximately greater than or equal to 90 degrees.

11. The electronic gaming machine of claim 10, wherein the arc is approximately 120 degrees.

12. A mounting assembly for removably coupling a monitor to a cabinet of an electronic gaming machine, the mounting assembly comprising:
    a mount configured to secure the monitor to the cabinet, the mount including a track frame, a carriage slidably coupled to the track frame and configured for coupling to the monitor, and a link pivotably coupled to the cabinet and the track frame; and
    a lift assembly comprising a harness coupled to the carriage and a drive mechanism coupled to the harness, the drive mechanism being operable to selectively release and retract the harness to pivot the track frame relative to the cabinet and slide the carriage along the track frame for moving the mount relative to the cabinet.

13. The mounting assembly of claim 12, wherein the lift assembly is operable to move the mount between a closed position, in which the mount is positioned within the cabinet, and an extended position, in which the mount is laterally spaced from the cabinet.

14. The mounting assembly of claim 13, wherein the mount further comprises a rotatable frame configured to couple to the monitor and a bearing assembly rotatably coupling the rotatable frame to the carriage for rotating the monitor relative to the cabinet when the monitor is in the extended position.

15. The mounting assembly of claim 14, wherein the bearing assembly includes an arcuately extending guide track and a sliding connector moveably engaged with the guide track, wherein movement of the sliding connector along the guide track causes the monitor to rotate relative to the cabinet.

16. The mounting assembly of claim 12, wherein the lift assembly further comprises a pulley coupled to the cabinet and positioned above the mount, the harness extending from the drive mechanism, through the pulley, and to the carriage.

17. The mounting assembly of claim 12, wherein the lift assembly is operable to move the monitor between a closed position, in which the mount is positioned within the cabinet, and an extended position, in which the mount is laterally spaced from cabinet, the cabinet including a stop that engages the mount when the monitor is in the extended position, and wherein selective release of the harness causes the carriage to move relative to the frame when the stop is engaged with the mount.

18. An electronic gaming machine comprising:
a pedestal;
a monitor configured to display an electronic game; and
a mounting assembly for removably coupling the monitor to the pedestal, the mounting assembly comprising:
  a mount configured to secure the monitor to the pedestal, the mount including a carriage coupled to the monitor and a linkage assembly, the linkage assembly including a track frame and a link pivotably coupled to the pedestal and the track frame, the carriage being slidably coupled to the track frame;
  a harness coupled to the carriage; and
  a drive mechanism coupled to the harness and operable to selectively release and retract the harness to pivot the track frame relative to the pedestal and slide the carriage along the track frame for moving the monitor relative to the pedestal.

* * * * *